US012036821B2

(12) United States Patent
Voss et al.

(10) Patent No.: US 12,036,821 B2
(45) Date of Patent: Jul. 16, 2024

(54) TRUCK TIRE TREAD WITH DECOUPLING VOID AND ASSOCIATED DECOUPLING VOID SIPE

(71) Applicant: Compagnie Generale des Etablissements Michelin, Clermont-Ferrand (FR)

(72) Inventors: Stefan Voss, Greer, SC (US); Brian William Jenkins, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 154 days.

(21) Appl. No.: 17/780,595

(22) PCT Filed: Dec. 16, 2020

(86) PCT No.: PCT/US2020/065310
§ 371 (c)(1),
(2) Date: May 27, 2022

(87) PCT Pub. No.: WO2021/126976
PCT Pub. Date: Jun. 24, 2021

(65) Prior Publication Data
US 2023/0001744 A1    Jan. 5, 2023

(51) Int. Cl.
*B60C 11/01* (2006.01)
*B60C 11/12* (2006.01)
*B60C 11/03* (2006.01)

(52) U.S. Cl.
CPC .......... *B60C 11/1259* (2013.01); *B60C 11/01* (2013.01); *B60C 11/124* (2013.01);
(Continued)

(58) Field of Classification Search
CPC ................. B60C 11/01; B60C 11/1259; B60C 2011/013; B60C 2011/0348; B60C 2011/0397; B60C 2011/1268
See application file for complete search history.

(56) References Cited

U.S. PATENT DOCUMENTS 4,480,671 A    11/1984  Giron
4,836,257 A     6/1989  Mamada et al.
(Continued)

FOREIGN PATENT DOCUMENTS

DE    4447417 A1 *  7/1996   ............. B60C 11/01
GB    2160829 A  *  1/1986   ......... B60C 11/0318
(Continued)

OTHER PUBLICATIONS

European Patent Office, International Search Report dated Feb. 22, 2021, pp. 1-16 (included), European Patent Office, Rijswijk, The Netherlands.

*Primary Examiner* — Robert C Dye
(74) *Attorney, Agent, or Firm* — Neal P. Pierotti

(57) ABSTRACT

A tread for a heavy truck tire is provided that has a bottom surface (14), a shoulder rib (16), and a sacrificial rib (20) located outboard from the shoulder rib (16) in a width direction. A decoupling void (30) is located between the shoulder rib (16) and the sacrificial rib (20). First decoupling void sipes (32), second decoupling void sipes (100) and third decoupling void sipes (104) are in the shoulder rib (16), and one second decoupling void sipe (100) is between one first decoupling void sipe (32) and one third decoupling void sipe (104). The first and third decoupling void sipes (32, 104) are closer to the bottom surface (14) than is the decoupling void (30) in the thickness direction. The second decoupling void sipe (100) is not closer to the bottom surface (14) than is the decoupling void (30) to the bottom surface (14) in the thickness direction.

13 Claims, 22 Drawing Sheets

(52) U.S. Cl.
CPC ... *B60C 11/1281* (2013.01); *B60C 2011/0348* (2013.01); *B60C 2011/0397* (2013.01); *B60C 2011/1268* (2013.01); *B60C 2200/06* (2013.01)

(56) References Cited

U.S. PATENT DOCUMENTS

| | | | |
|---|---|---|---|
| 4,878,526 A * | 11/1989 | Ochiai | B60C 11/12 152/DIG. 3 |
| 5,307,851 A | 5/1994 | Yamashita | |
| 6,488,064 B1 | 12/2002 | Radulescu | |
| 2009/0065115 A1 | 3/2009 | Mathews | |
| 2018/0244111 A1 | 8/2018 | Zhu et al. | |

FOREIGN PATENT DOCUMENTS

| | | | |
|---|---|---|---|
| JP | S61146606 A | | 7/1986 |
| JP | S61196806 A | | 9/1986 |
| JP | 02133203 A | * | 5/1990 |
| JP | 2004268783 A | | 9/2004 |

\* cited by examiner

TRUCK TIRE TREAD WITH DECOUPLING VOID AND ASSOCIATED DECOUPLING VOID SIPE

CROSS-REFERENCE TO RELATED APPLICATIONS

The present application is a 35 U.S.C. § 371 application of PCT/US2020/065310 filed on Dec. 16, 2020 and entitled "Truck Tire Tread with Decoupling Void and Associated Decoupling Void Sipe." PCT/US2020/065310 claims the benefit of PCT/US19/66770 filed on Dec. 17, 2019 and entitled "Truck Tire Tread with Decoupling Void and Associated Decoupling Void Sipe." The entire contents of PCT/US2020/065310 and PCT/US19/66770 are incorporated by reference herein in their entireties for all purposes.

FIELD OF THE INVENTION

The subject matter of the present invention relates to a truck tire with a decoupling void and associated decoupling void sipe for improved aggression performance More particularly, the present application involves a truck tire with a decoupling void sipe that is deeper into the tread than the decoupling void that provides bridging support to the decoupling void to protect the tread from aggression damage.

BACKGROUND OF THE INVENTION

Manufacturers of heavy commercial vehicle tires have made progress in developing tire architectures and tire materials that allow increase in the wear resistance of tire treads and the reduction of the rolling resistance of tires while at the same time improving their level of grip and resistance to road hazard. Irregular tread wear (also called "uneven wear" or "abnormal wear") is a great concern for heavy commercial vehicle tires as it can progressively induce tire vibrations that become sensed by the driver through the steering wheel. It can also make for a poor looking wear pattern. Both of these undesired effects often lead to the tire being removed from service at an early stage of its wear life. Generally, the more the tire is put through a slow-wearing usage, the more irregular wear is affecting the removal mileage. This is why resistance to irregular wear is of paramount importance for truck tires in the so-called long haul steer usage.

It is known to include structural features in tires to fight irregular wear. For example, a sacrificial rib can be incorporated into the tread architecture to delay the onset of irregular wear. However, this feature is sensitive to curbing aggression and its use may not be practical outside of North American long haul applications. This design can on occasion lead to cracking at the bottom of the decoupling groove which may lead to early removal and customer dissatisfaction. Other sculptural features that can combat irregular wear include microsipes and inclined microsipes. These are small grooves that extend generally in the lateral, width direction of the tire. Unfortunately, these features are unusable in severe usage applications due to aggression concerns. Aggression on tires is a concern in growing or emerging markets that feature roadways that subject the tire to more severe usage that functions to tear up and wear down the tread at a higher rate than roads that are smoother and in better condition. Although mechanisms are known for reducing or eliminate irregular wear, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
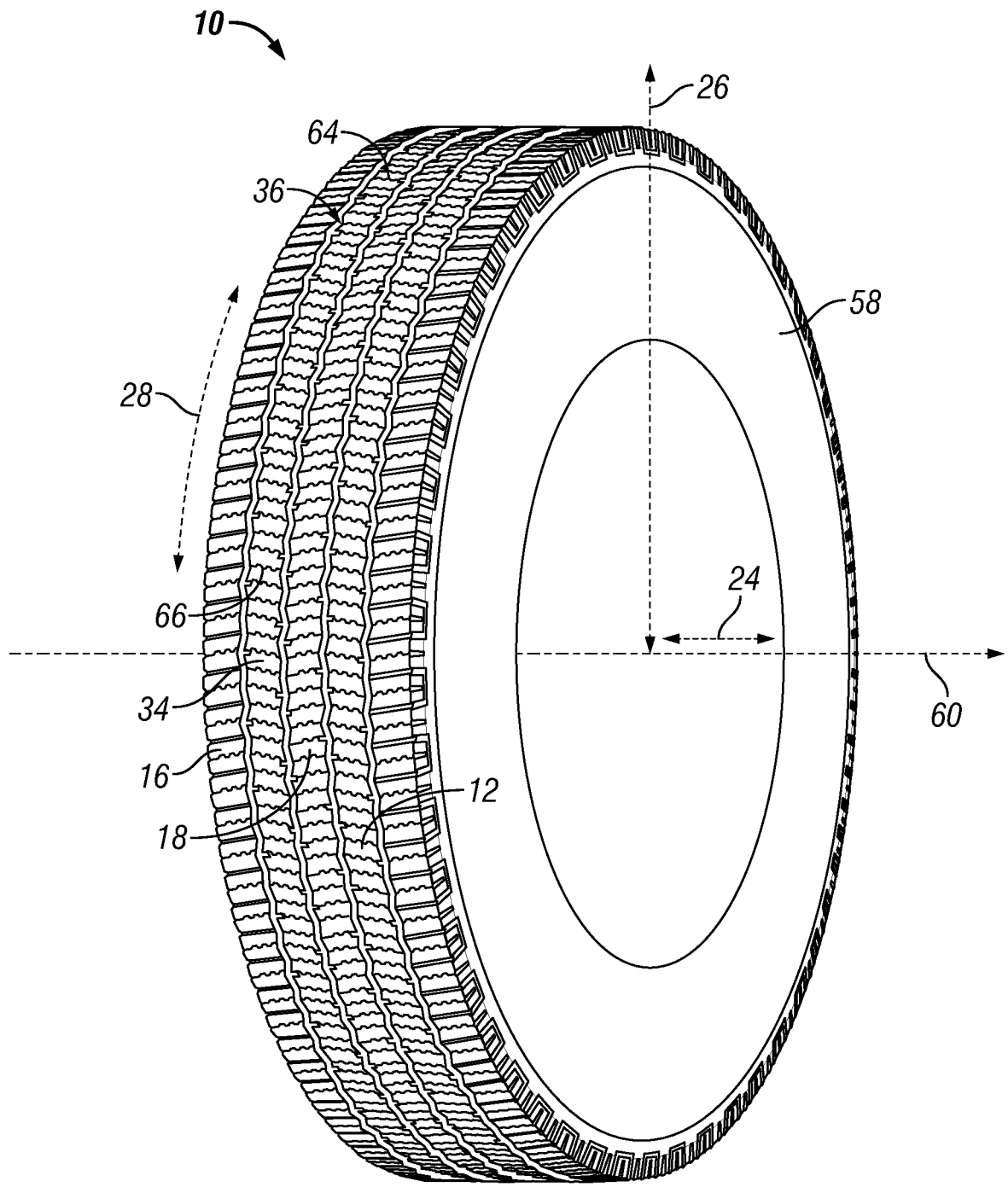
FIG. 1 is a perspective view of a heavy truck tire in accordance with one exemplary embodiment.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a decoupling void sipe 32 that engages a decoupling void 30 in a heavy duty truck tire 10 that functions to reduce or eliminate aggression damage. The tread 12 has a shoulder rib 16 and an adjacent sacrificial rib 20 with the decoupling void 30 therebetween. The decoupling void sipe 32 is in the shoulder rib 16 and opens into the decoupling void 30. Both the decoupling void sipe 32 and the decoupling void 30 extend in a thickness direction 26 of the tread 12 towards a bottom surface 14 of the tread 12, with the decoupling void sipe 32 closer to the bottom surface 14 than the decoupling void 30. This arrangement added a bridging effect across the bottom of the decoupling void 30 that functions to reduce or eliminate aggression damage to the tread 12 while maintaining the aspects of the decoupling void 30. It is hypothesized that aggression damage is caused by impacts near the shoulder of the tire 10 by hitting curbs, potholes, etc., and the bridging of the decoupling void sipe 32 will strengthen the bottom of the decoupling void 30 and minimize or eliminate this aggression damage.

FIG. 1 shows a tire 10 that is a heavy duty truck tire 10. In this regard, the tire 10 is not designed for nor used with a car, motorcycle, or light truck (payload capacity less than 4,000 pounds) but is instead designed for and used with heavy duty trucks such as 18 wheelers, garbage trucks, or box trucks. The tire 10 may be a steer tire, a drive tire, a trailer tire, or an all position tire. The tire 10 includes a carcass 58 onto which a tread 12 is disposed thereon. The central axis 60 of the tire 10 extends through the center of the carcass 58, and the axial direction 24, which can be called the width direction 24, of the tire 10 is parallel to the central axis 60. The radial direction 26 of the tire 10 can be referred to as the thickness direction 26 and is perpendicular to the central axis 60. The tread 12 is located farther from the central axis 60 in the thickness direction 26 than the carcass 58. The tread 12 extends all the way around the carcass 58 in the circumferential direction 28 of the tire 10 and circles the central axis 60 360 degrees. The circumferential direction 28 can also be referred to as the longitudinal direction 28 of the tread 12.

The tread 12 features five ribs 64 that are separated by four longitudinal grooves that extend in the circumferential direction 28 completely about the tire 10. The five ribs 64 can be classified as a central rib, two intermediate ribs, and two shoulder ribs. One of the longitudinal grooves is labeled as shoulder tread groove 36 and it is the longitudinal groove that separates a shoulder rib 16 from an intermediate rib 34 of the tread 12. Although five ribs 64 are shown any number of ribs 64 can be present in other exemplary embodiments. The ribs 64 can each be made up of a number of tread blocks that can have various shapes, sizes, and configurations. The inclusion of these architectural features gives the tread 12 different performance properties in use. The tread 12 may include certain structural features that can reduce abnormal wear. One such structural feature may be sipes 66 that extend across the tread blocks of the ribs 64 in the width direction 24. The tread 12 has a first tread edge and an oppositely disposed second tread edge in the width direction 24. The rolling tread width of the tread 12 extends from one edge to the other edge and is the portion of the tread 12 that is designed to engage the ground when the tire 10 is new before any tread 12 wear has occurred. The tire 10 can be a brand new tire with the carcass 58 and tread 12 formed at the same time with both being brand new. Alternatively, the tread 12 may be provided as a retread band that is newly formed and then subsequently attached to an existing, used carcass 58 through a retread process. It is to be understood that the tire 10 illustrated in FIG. 1 does not include a sacrificial rib 20 or a decoupling void sipe 32 in accordance with the present invention.

Figure 2:
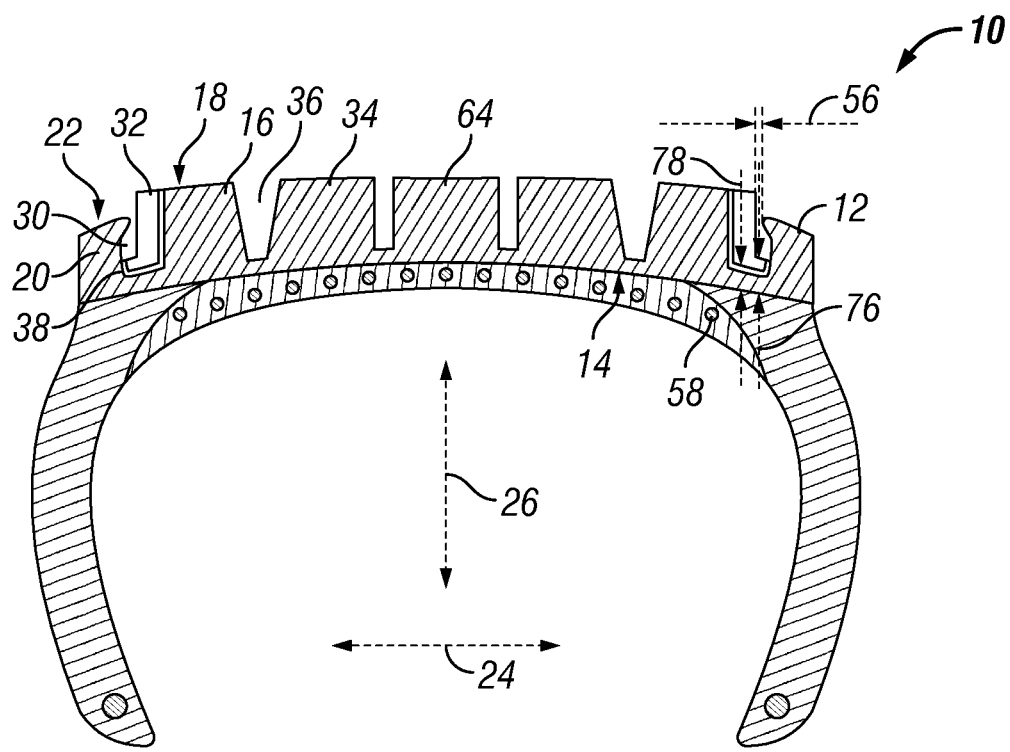
FIG. 2 is a cross-sectional view of a tire in accordance with one exemplary embodiment.

FIG. 2 is a cross-sectional view of a tire 10 that incorporates a decoupling void sipe 32 in accordance with one exemplary embodiment. The tread 12 has ribs 64 that include a single center rib, a pair of intermediate ribs, and two shoulder ribs 16. Also present is a pair of sacrificial ribs 20 that are adjacent the two shoulder ribs 16 and are on opposite ends of the tread 12 in the width direction 24. The sacrificial ribs 20 are provided to protect the shoulder ribs 16 during use of the tire 10 and will normally wear first so that the shoulder ribs 16 are not subjected to irregular wear during use. The height of the shoulder ribs 16 in the thickness direction 26 is greater than the height of the sacrificial ribs 20 in the thickness direction 26. The sacrificial rib 20 is separated from the shoulder rib 16 by a decoupling void 30 that can be made so as to have a variety of shapes. The FIG. 2 embodiment shows the decoupling void 30 as having a greater width deeper into the tread 12 formed by the overturned portion of the sacrificial rib 20. The sacrificial rib 20 can be part of the tread 12 and can be formed with the rest of the ribs 64 and attached to the top of the carcass 58.

Figure 3:
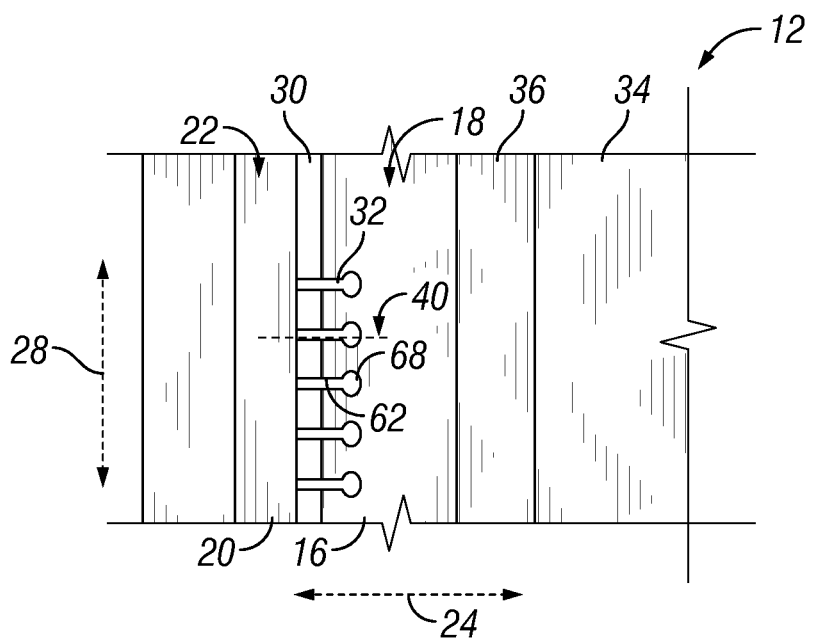
FIG. 3 is top view of a portion of the tire tread of FIG. 2.
Figure 4:
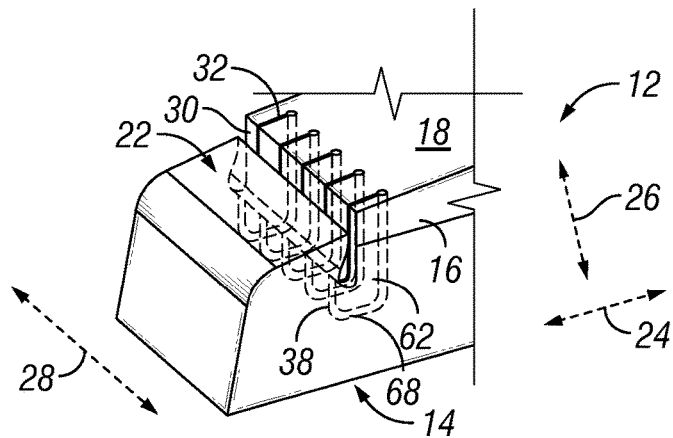
FIG. 4 is a perspective view of a portion of the tire tread of FIG. 2.

A portion of the tread 12 of the tire 10 of FIG. 2 is shown in FIGS. 3 and 4. A plurality of decoupling void sipes 32 are located in the shoulder rib 16 and are spaced from one another in the longitudinal direction 28. The shoulder rib 16 has an upper surface 18 that engages the road surface, and the decoupling void sipe 32 is open at this upper surface 18. The decoupling void sipe 32 can be variously shaped and sized, and in the embodiment shown has a main portion 68, that has a small width, and a teardrop 62 at the end of the main portion 68 that is circular in shape with a width greater than that of the main portion 68. Both the main portion 68 and the teardrop 62 are open at the upper surface 18. The decoupling void sipe 32 opens into the decoupling void 30, and the main portion 68 is the part of the decoupling void sipe 32 that opens into this feature. The decoupling void sipe 32 extends into the tread 12 a greater depth than the decoupling void 30 in the thickness direction 26. The decoupling void sipe 32 has a width that is less than 2 millimeters. This width may be measured at the main portion 68 so that the main portion 68 is less than 2 millimeters in width, and the teardrop 62 could be less than 2 millimeters, or the teardrop 62 may be 2 millimeters or greater in width. In some embodiments, no portion of the decoupling void sipe 32 has a width 2 millimeters or greater.

With respect to FIG. 2, the tread 12 has a bottom surface 14 that engages the carcass 58. The decoupling void sipe 32 extends to a point closer to the bottom surface 14 than does the decoupling void 30. A distance 78 extends completely in the thickness direction 26 and is the closest distance of the decoupling void sipe 32 to the bottom surface 14. The bottom surface 14 can be the bottom boundary of the extruded tread compound that is generally laid on top of the belt package that is also referred to as part of the carcass 58. A distance 76 extends completely in the thickness direction 26 and is the closest distance of the decoupling void 30 to the bottom surface 14. The distance 78 is smaller than the distance 76 which indicates that the decoupling void sipe 32 is closer to the bottom surface 14 and the decoupling void 30 is farther from the bottom surface 14 than the decoupling void sipe 32.

The decoupling void sipe 32 extends outboard in the width direction 24 to a farthest outboard extent 38 which is the portion of the decoupling void sipe 32 closest to the outer edge of the tread 12 in the width direction 24. The farthest outboard extent 38 may be at a position in the width direction 24 that is not as far outboard as the decoupling void 30, more outboard than the decoupling void 30, or at the same outboard extent as the decoupling void 30 in the width direction 24. In this particular embodiment, the farthest outboard extent 38 is the same as the farthest outboard extent of the decoupling void 30 in the width direction 24. The sacrificial rib 20 has an upper surface 22 that is on the outer surface of the tread 12. The decoupling void sipe 32 does not extend to the upper surface 22 and is not located in the sacrificial rib 20 in this embodiment. With reference now to FIG. 3, it can be seen that the decoupling void sipe 32 is oriented completely in the width direction 24. In this regard, a width angle 40 of the decoupling void sipe 32 is zero degrees. This width angle 40 can be measured by drawing a line though the center of the decoupling void sipe 32 and comparing the angle of this line relative to a line extending completely in the width direction 24. The teardrop 62 is present at the farthest inboard and outboard portions of the decoupling void sipe 32 and is present at the deepest portion of the decoupling void sipe 32 in the thickness direction 26. The teardrop 62 need not be present in other exemplary embodiments. The decoupling void sipe 32 extends completely in the thickness direction 26. The arrangement of the decoupling void sipe 32 thus causes it to extend below the decoupling void 30 and to extend across the entire width of the decoupling void 30. Should the decoupling void sipe 32 have a geometry that makes it difficult to ascertain the width angle 40, one could draw a straight line from a point at the intersection of the decoupling void sipe 32 and decoupling void 30, to a point that is the most inboard extent of the decoupling void sipe 32 in the width direction 24. The straight line drawn between these two points can then be measured relative to a line drawn completely in the width direction 24 to ascertain the width angle 40.

Figure 5:
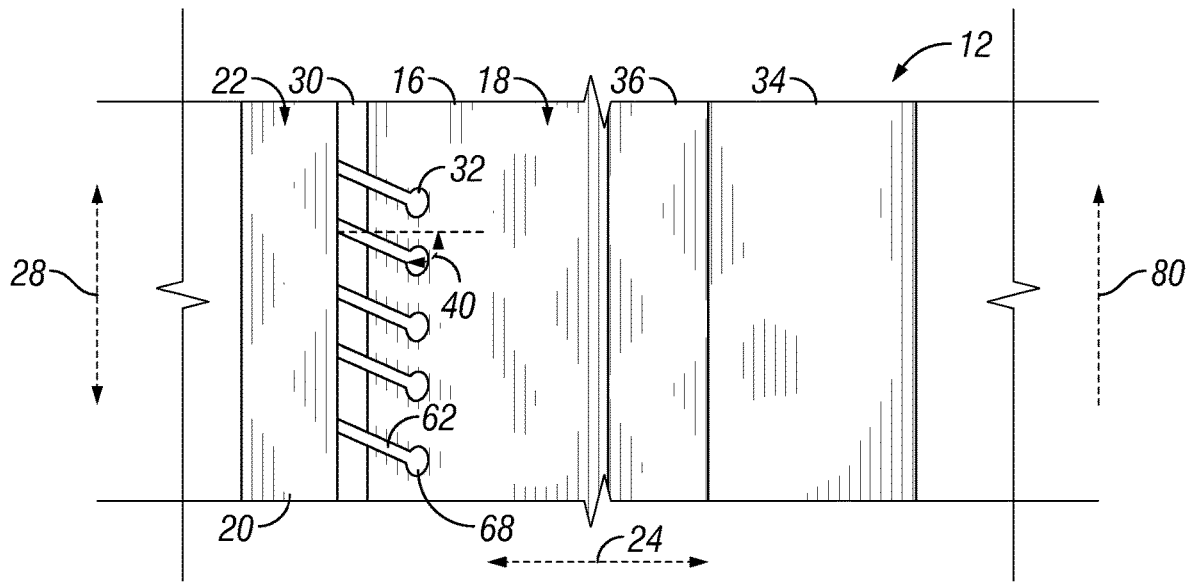
FIG. 5 is a top view of a portion of tread that has decoupling void sipes angled in the width direction.
Figure 6:
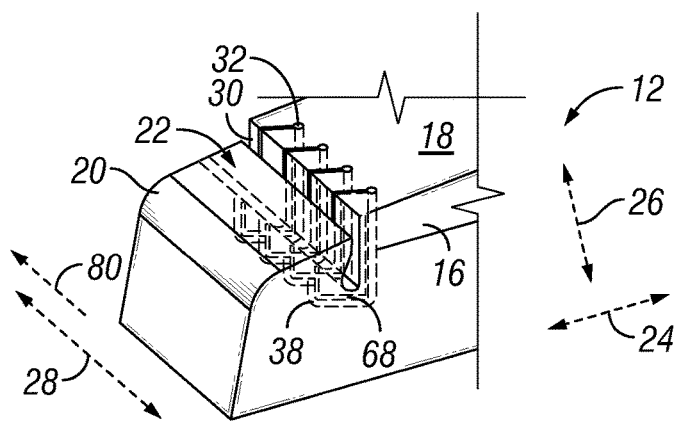
FIG. 6 is a perspective view of a portion of the tread of FIG. 5.

Another embodiment of the tread 12 is illustrated with reference to FIGS. 5 and 6 in which the relevant portions of the tread 12 are shown. The decoupling void sipes 32 are arranged as previously discussed with the exception that their width angle 40 is not zero. The width angle 40 is 25 degrees. The width angle 40 constant over the entire decoupling void sipe 32. In other embodiments, the width angle 40 can be 5 degrees, 10 degrees, 15, degrees, 20 degrees, or greater than zero to 25 degrees. The tread 12 may be directional in that the tread features are provided so that the tread 12 is designed to roll primarily in one direction. The designed for, forward, direction of roll is known as the rolling direction 80 and is noted in FIGS. 5 and 6. The width angle 40 is arranged so engagement of the decoupling void sipe 32 with the decoupling void 30 is forward relative to the rolling direction 80 of the end of the decoupling void sipe 32 that is most inboard into the shoulder rib 16 in the width direction 24.

Figure 7:
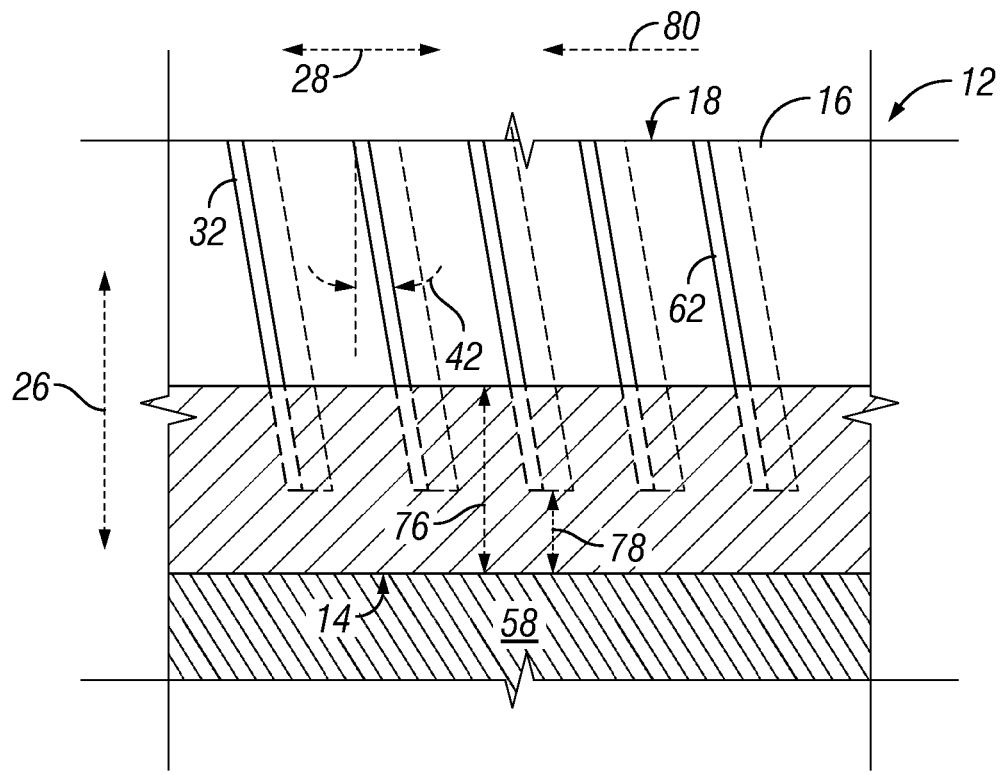
FIG. 7 is a partial cross-sectional view taken from inside of a decoupling void that shows the decoupling void sipes angled relative to the thickness direction.

FIG. 7 shows a cross-sectional view of another embodiment of the tread 12 taken from inside the decoupling void 30 where the side wall of the shoulder rib 16 that defines part of the decoupling void 30 is visible. The decoupling void sipe 32 can be seen to open through the side wall of the shoulder rib 16 and into the decoupling void 30. The decoupling void sipe 32 also extends below the bottom of the decoupling void 30 in the thickness direction 26 so as to be closer to the bottom surface 14 than is the bottom of the decoupling void 30. The distance 78 is shorter than the distance 76 and these distances 76, 78 represent the closest approaches of the decoupling void 30 and the decoupling void sipe 32 to the bottom surface 14. The decoupling void sipe 32 is angled relative to the width direction 24 so that the width angle 40 is again not zero, and in the disclosed embodiment is 25 degrees. Additionally, the orientation of the decoupling void sipe 32 is angled relative to the thickness direction 26 so that it does not extend completely in the thickness direction 26. The orientation of the decoupling void sipe 32 to thickness direction 26 can be measured via a thickness angle 42. The thickness angle 42 is measured starting from the point the decoupling void sipe 32 engages the upper surface 18. A line drawn completely in the thickness direction 26 extends through this point, and the thickness angle 42 is measured between this vertical line and the decoupling void sipe 32. It may be the case that the decoupling void sipe 32 has a shape that makes it difficult for its orientation relative to the thickness direction 26 to be measured, for example the decoupling void sipe 32 may have an undulating shape and be linear. In these instances, a point can be located at the opening of the decoupling void sipe 32 at the upper surface 18, and a second point can be located at the deepest location of the decoupling void sipe 32 into the tread 12 in the thickness direction 26, and a straight line can be drawn between these two points. The thickness angle 42 is measured between this straight line, and the straight line extending completely in the thickness direction 26 that goes through the intersection of the decoupling void sipe 32 and the upper surface 18.

Figure 8:
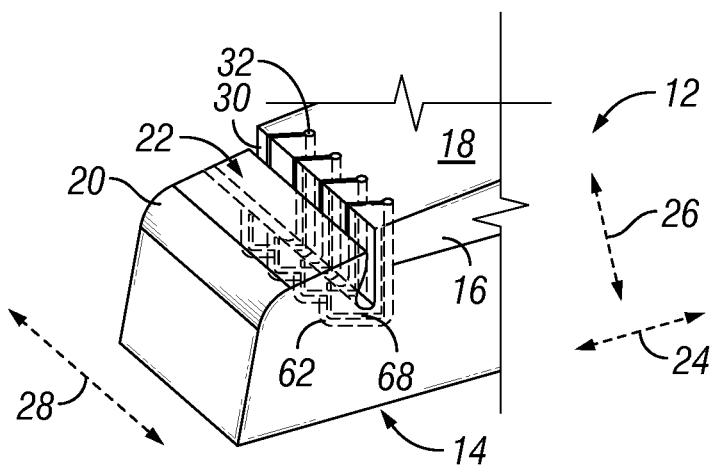
FIG. 8 is a perspective view of a portion of the tread of FIG. 7.

The thickness angle 42 in FIG. 7 is 8.5 degrees. The thickness angle 42 may be different in other embodiments and can be from greater than 0 to 15 degrees, 15 degrees, 25 degrees, from greater than 0 to 25 degrees, 12 degrees, from 10 to 15 degrees, from 15 to 20 degrees, from 20 to 25 degrees, from greater than 0 degrees to 5 degrees, or from 5 to 10 degrees in other embodiments. The entire height of the decoupling void sipe 32 may have the same thickness angle 42 orientation relative to the thickness direction 26. The rolling direction 80 is noted, and the decoupling void sipe 32 is oriented so that upon extension into the tread 12 from the upper surface 18 the decoupling void sipe 32 extends opposite to the rolling direction 80 in the circumferential direction 28. However, other embodiments are possible in which the thickness angle 42 causes the decoupling void sipe 32 to extend from the upper surface 18 so that the bottom of the decoupling void sipe 32 is located forward in the rolling direction 80 from the point of the decoupling void sipe 32 at the upper surface 18. Also, the tread 12 may not be a directional tread 12 so that it does not have a rolling direction 80 and the thickness angle 42 in these instances can be positive or negative. FIG. 8 shows a portion of the tread 12 that includes the decoupling void sipes 32 that are oriented so that they have both a width angle 40 and a thickness angle 42 that are not zero degrees. In this particular embodiment, the width angle 40 is 25 degrees and the thickness angle 42 is 8.5 degrees. However, it is to be understood that in other embodiments, the thickness angle 42 could be greater than zero, while the width angle 40 is zero degrees. The decoupling void sipe 32 may be arranged to extend into the sacrificial rib 20 but remain hidden in the sacrificial rib 20.

Figure 9:
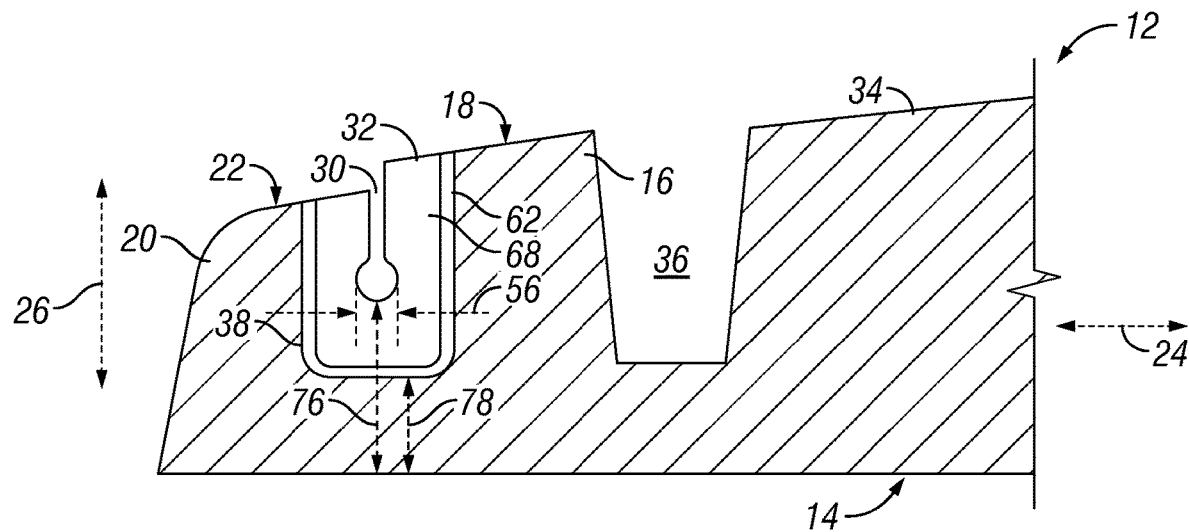
FIG. 9 is a cross-sectional view taken along line 9-9 of FIG. 10.
Figure 10:
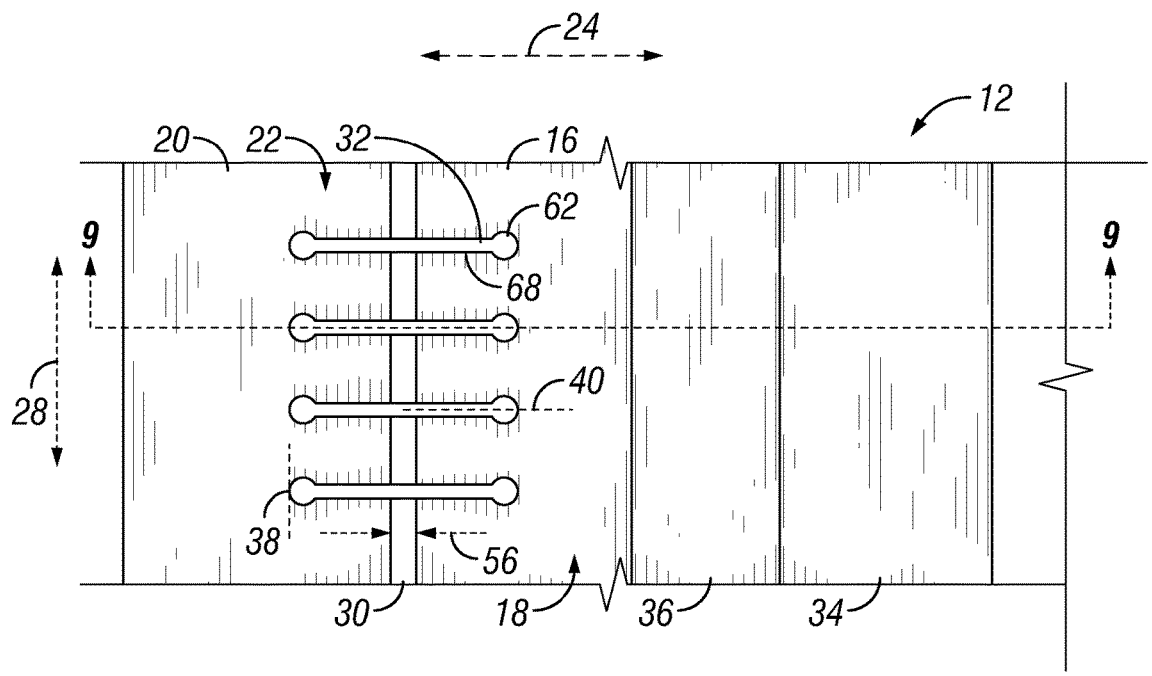
FIG. 10 is a top view of a portion of the tread in accordance with another exemplary embodiment.
Figure 11:
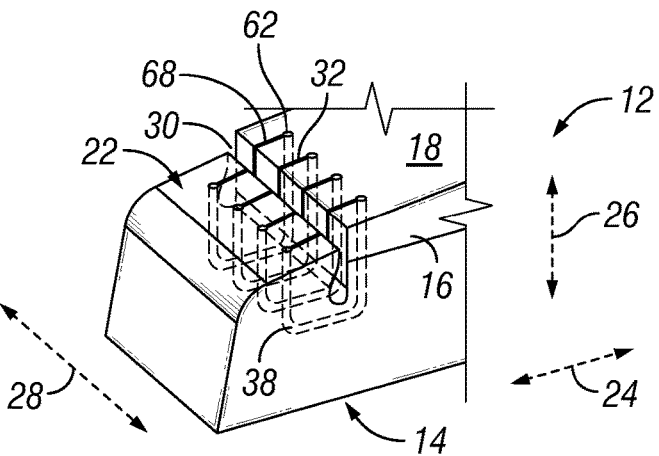
FIG. 11 is a perspective view of a portion of the tread of the FIG. 10 embodiment.

FIGS. 9-11 illustrate another embodiment of the tread 12. The decoupling void 30 has a teardrop at its bottom end and has a main section that is linear in shape. The decoupling void 30 may extend completely in the longitudinal direction 28 or can be wavy or angled upon its extension in the longitudinal direction 28. The decoupling void sipe 32 again extends from the upper surface 18 into the tread 12 so that the distance 78 is less than the distance 76. However, the decoupling void sipe 32 extends outboard beyond the decoupling void 30 in the width direction 24 so that the farthest outboard extent 38 is outboard of the entire decoupling void 30 in the width direction 24. The decoupling void sipe 32 extends to the upper surface 22 and is open at the upper surface 22. The teardrop portion 62 is located at the farthest outboard and inboard extents of the decoupling void sipe 32 in the width direction 24, and at the location of the decoupling void sipe 32 deepest into the tread 12 and closest to the bottom surface 14 in the thickness direction 26. The remaining edges of the decoupling void sipe 32 are the main portion 68 and do not have a teardrop portion 62 and these portions engage the upper surfaces 18, 22 and the decoupling void 30. The width angle 40 and thickness angle 42 are both zero degrees in the illustrated embodiment. The decoupling void 30 has a width 56 that can be two millimeters or greater in some embodiments. In these cases, the decoupling void 30 may be referred to a decoupling groove as a groove is a void having a width 2 millimeters or greater. In instances where the decoupling void 30 has a width 56 that is less than 2 millimeters, the decoupling void 30 could be called a decoupling sipe. The width 56 can be measured as the maximum width of the decoupling void 30, which could be the width 56 of the teardrop of the decoupling void 30 in the width direction 24, or may be measured as the width of the majority of the decoupling void 30 that has the same shape/size which in the present instance would be the portion of the decoupling void 30 above the teardrop portion in the thickness direction 26. The decoupling void sipe 32 extends into the sacrificial rib 20 and is not hidden in the sacrificial rib 20 because it is open at the upper surface 22.

A shoulder tread groove 36 separates the shoulder rib 16 from the intermediate rib 34. The shoulder tread groove 36 has a bottom that is a distance from the bottom surface 14 in the thickness direction 26 that is greater than the distance 78. In other embodiments, the distance from the bottom surface 14 to the bottom of the shoulder tread groove 36 in the thickness direction 26 is the same as distance 78. The decoupling void sipe 32 is located in the shoulder rib 16 and does not extend to the shoulder tread groove 36 so that it does not open into the shoulder tread groove 36.

Figure 12:
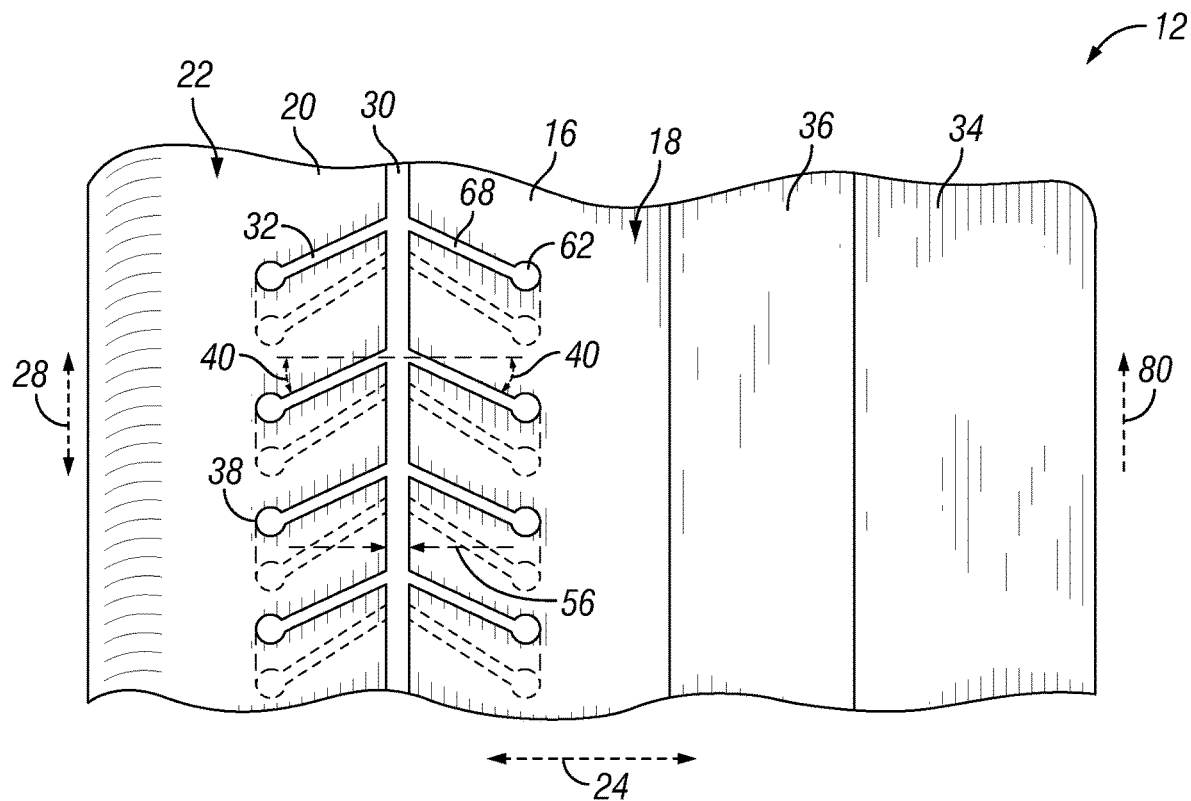
FIG. 12 is a top view of a portion of tread in accordance with another exemplary embodiment.

Another embodiment of the tread 12 is shown in top view in FIG. 12 which illustrates the relevant portions of the design. The decoupling void sipe 32 is again open at the upper surface 18. However, it is to be understood that the decoupling void sipe 32 need not be open at the upper surface 18 and/or the upper surface 22 in other embodiments. The decoupling void sipe 32 is oriented at a width angle 40 that is greater than zero and is 25 degrees in this embodiment. The portion of the decoupling void sipe 32 inboard of the decoupling void 30 in the width direction 24 is oriented differently relative to the width direction 24 than the portion of the decoupling void sipe 32 outboard of the decoupling void 30 in the width direction 24. The portion of the decoupling void sipe 32 outboard of the decoupling void 30 in the width direction 24 has a width angle 40 that likewise has a magnitude of 25 degrees. Both portions on either side of the decoupling void 30 extend from the decoupling void 30 at the same magnitude of the width angle 40 rearward relative to the rolling direction 80 in the circumferential direction 28. The decoupling void sipe 32 is symmetrical with respect to the decoupling void 30 but need not be symmetrical relative to the decoupling void 30 in other embodiments. The decoupling void sipe 32 also has a thickness angle 42 that is not zero, 8.5 degrees in this embodiment, and extends rearward relative to the rolling direction 80 so that the bottom of the decoupling void sipe 32 is rearward of the openings at the upper surfaces 18, 22 in the circumferential direction 28.

Figure 13:
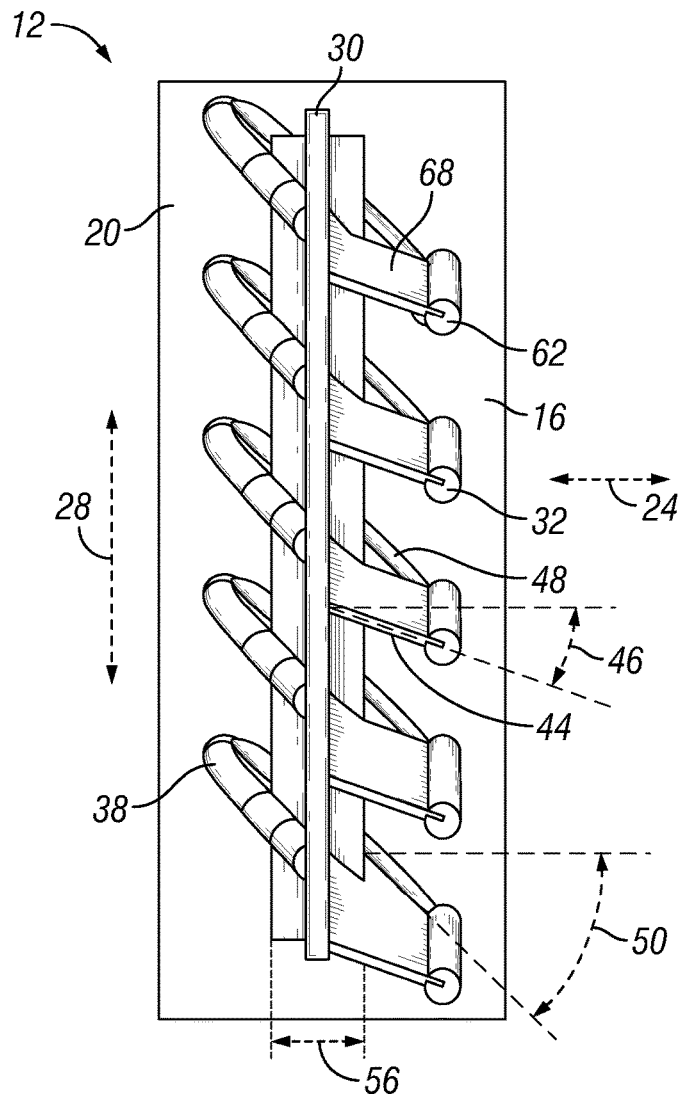
FIG. 13 is a top view that shows the decoupling void and decoupling void sipes in accordance with another exemplary embodiment.
Figure 14:
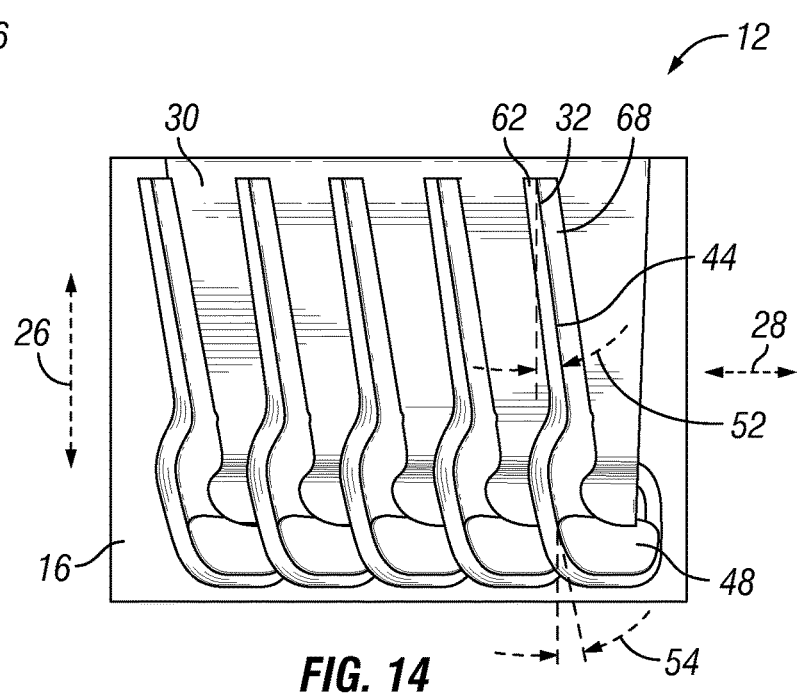
FIG. 14 is a side view of FIG. 13.
Figure 15:
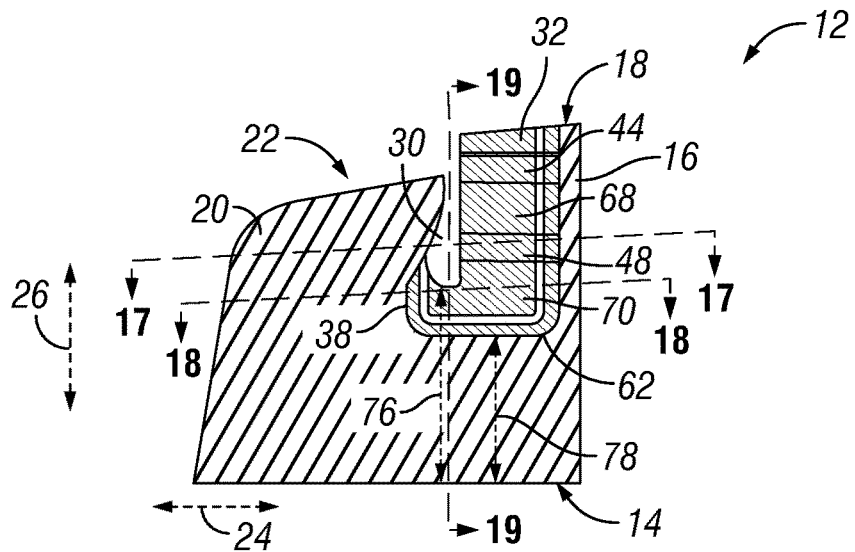
FIG. 15 is a cross-sectional view of a portion of a tread in accordance with another exemplary embodiment.

FIGS. 13 and 14 show another embodiment of the tread 12 in which the decoupling void 30, decoupling void sipes 32, and orientations of the shoulder ribs 16 and sacrificial ribs 20 are shown. The decoupling void sipes 32 are oriented both in the width 24 and thickness 26 directions so that they are not at zero angles in these directions. Further, the width and thickness orientations of the decoupling void sipes 32 are not the same along their entire lengths but instead change. The decoupling void sipe 32 has a first portion 44 that originates at the upper surface 18 and this first portion 44 is oriented at a first width angle 46 to the width direction 24. The first portion 44 is also oriented at a first thickness angle 52 relative to the thickness direction 26. The width angle 46 and thickness angle 52 can be measured the same as previously discussed with respect to the angles 40, 42, and may have magnitudes as previously discussed. The bottom of the decoupling void sipe 32 "twists" so that it has a different width angle. The first portion 44 transitions to a second portion 48 at a location at the top of the teardrop portion of the decoupling void 30 and maintains this second portion 48 for the rest of the decoupling void sipe 32 which terminates on the opposite side of the decoupling void 30 from the first portion 44. The second portion 48 terminates below the upper surface 22 and does not open at the upper surface 22. The second portion 48 includes the part of the decoupling void sipe 32 that is below the decoupling void 30 and is closer to the bottom surface 14 than the decoupling void 30. The second portion 48 has a second width angle 50 that is not zero degrees and is different in magnitude from the first width angle 46. Additionally, the second portion 48 has a second thickness angle 54 that is not zero degrees, and that is different in magnitude from the first thickness angle 52. Aside from having different width and thickness angles, the portions 44, 48 can have widths different from one another such that the second portion 48 is wider than the width of the first portion 44. It is thus the case that the width angles 46 and 50 of the decoupling void sipe 32 need not be the same across the entire decoupling void sipe 32 but can be different at different locations of the decoupling void sipe 32. Variation of the width angles 46, 50 of the decoupling void sipe 32 will impact the function of the decoupling void 30 and resistance to aggression damage. The smaller the magnitude of the width angle, the more laterally oriented the decoupling void sipe 32 will be and the more coupled the shoulder and sacrificial ribs 16, 20 will become. Increasing the magnitude of the width angle will cause the shoulder rib 16 and the sacrificial rib 20 to be less coupled to one another.

Figure 16:
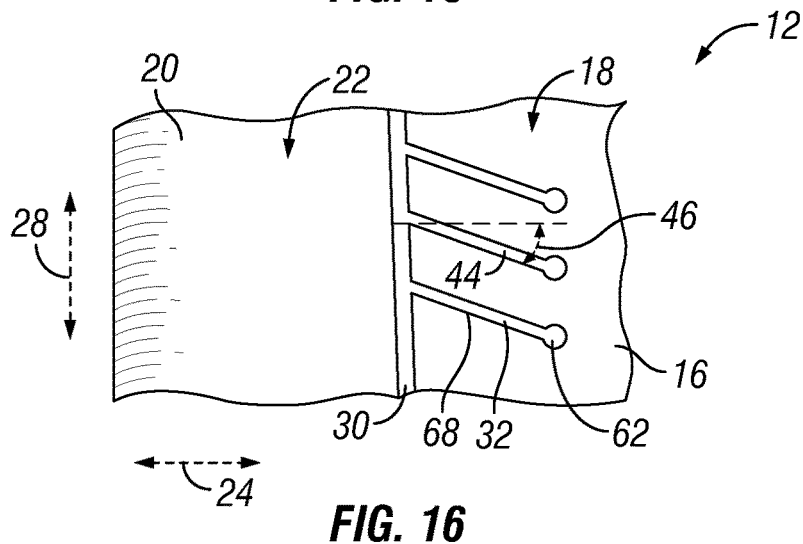
FIG. 16 is a top view of FIG. 15.
Figure 17:
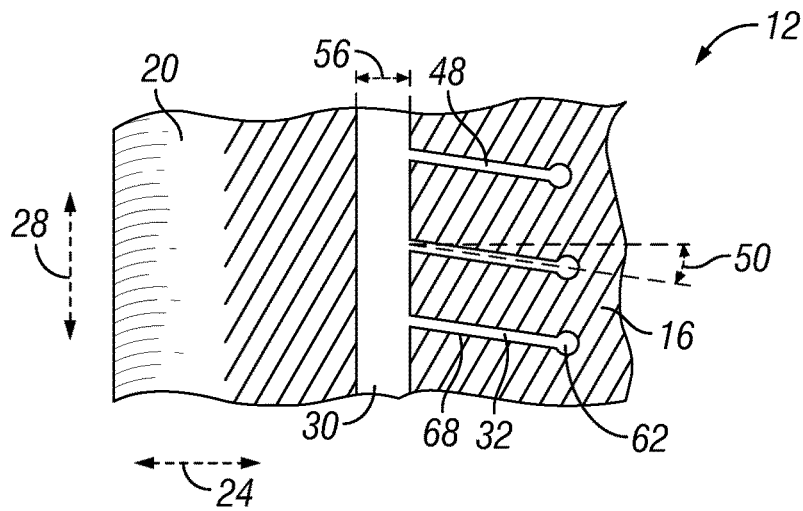
FIG. 17 is a cross-sectional view taken along line 17-17 of FIG. 15.
Figure 18:
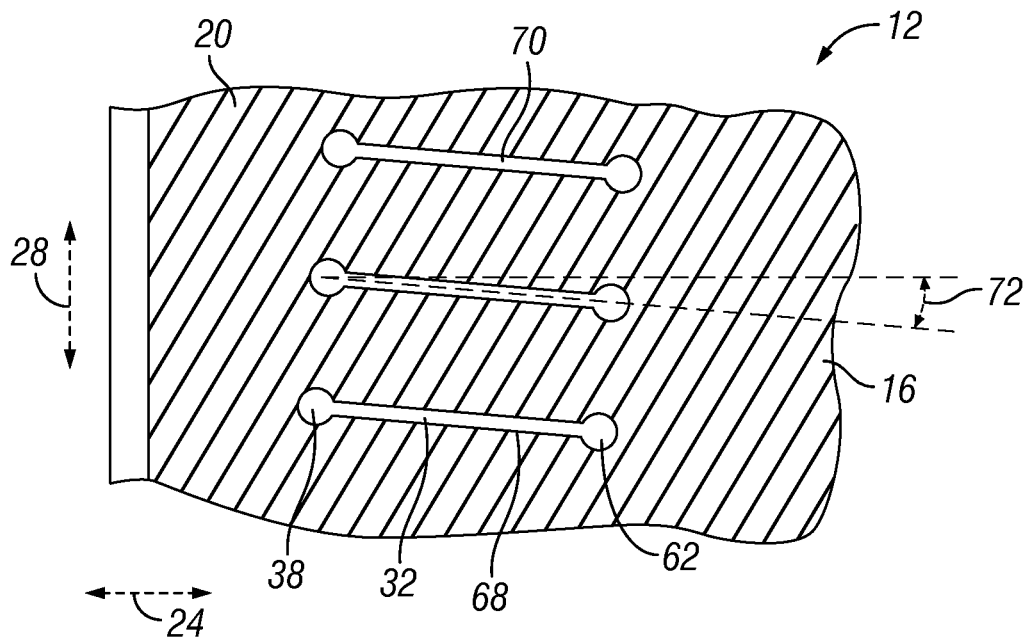
FIG. 18 is a cross-sectional view taken along line 18-18 of FIG. 15.

Another embodiment of the tread 12 is shown with reference to FIGS. 15-19 in which only the relevant portion of the tread 12 that includes the decoupling void sipe 32 is shown. The decoupling void sipe 32 extends outboard in the lateral direction 24 so that the farthest outboard extent 38 is outboard of the entire decoupling void 30 in the width direction 24, but the decoupling void sipe 32 does not extend to the upper surface 22 and is not open at the upper surface 22. The decoupling void sipe 32 is made of three portions 44, 48, 70 which have different orientations relative to the width and thickness directions 24, 26. Although three portions are shown in this embodiment, any number of portions of the decoupling void sipe 32 can be present in yet other versions of the tread 12. The top view of the tread 12 is shown in FIG. 16 and is the tread 12 in an unworn state. The decoupling void sipe 32 has a first portion 44 that is at a first width angle 46 relative to the width direction 24. The first width angle 46 is 20 degrees and can be measured in the manners as previously discussed. The first portion 44 extends a distance into the tread 12 in the thickness direction 26 until transitioning into a second portion 48 of the decoupling void sipe 32. The first portion 44 extends a longer length in the thickness direction 26 than does the amount of extension of the second portion 48 in the thickness direction 26. The second portion 48 can be seen in FIG. 17 which is a cross-sectional view taken along line 17-17 of FIG. 15. The second portion 48 is oriented at a second width angle 50 to the width direction 24. The second width angle 50 is less than the first width angle 46 and is 10 degrees in this embodiment. The cross-sectional shape of the second portion 48 is the same as the cross-sectional shape of the first portion 44. The second portion 48 extends in the thickness direction 26 to a height that is the same as the bottom of the decoupling void 30 such that the very bottom of the decoupling void 30 and the very bottom of the second portion 48 are the same distance to the bottom surface 14 in the thickness direction 26.

The remaining section of the decoupling void sipe 32 is made of the third portion 70 and this part includes the bottom of the decoupling void sipe 32 that is closest to the bottom surface 14, and the part of the decoupling void sipe 32 that is outboard from the decoupling void 30 in the width direction 24. The third portion 70 can be seen in the cross-sectional view of FIG. 18 and is likewise oriented relative to the width direction 24 at a non-zero angle. The third portion is oriented at a third width angle 72 that can be calculated as previously discussed and has a magnitude that is less than the magnitude of the first width angle 46 and is less than the magnitude of the second width angle 50. The third width angle 72 may be 5 degrees in the illustrated embodiment. The third width angle 72 is measured by comparing a line drawn through the third portion 70 originating from the most outboard portion of the third portion 70 in the width direction 24 to a line extending completely in the width direction 24. The cross-sectional shape of the third portion 70 is different than the cross-sectional shapes of the first and second portions 44, 48 due to the absence of the decoupling void 30 through parts of the third portion 70. As the tread 12 wears, different portions 44, 48, 70 with their resultant different orientations and shapes can be presented to the road so that the tread 12 exhibits different tread features at different points in its wear life.

Figure 19:
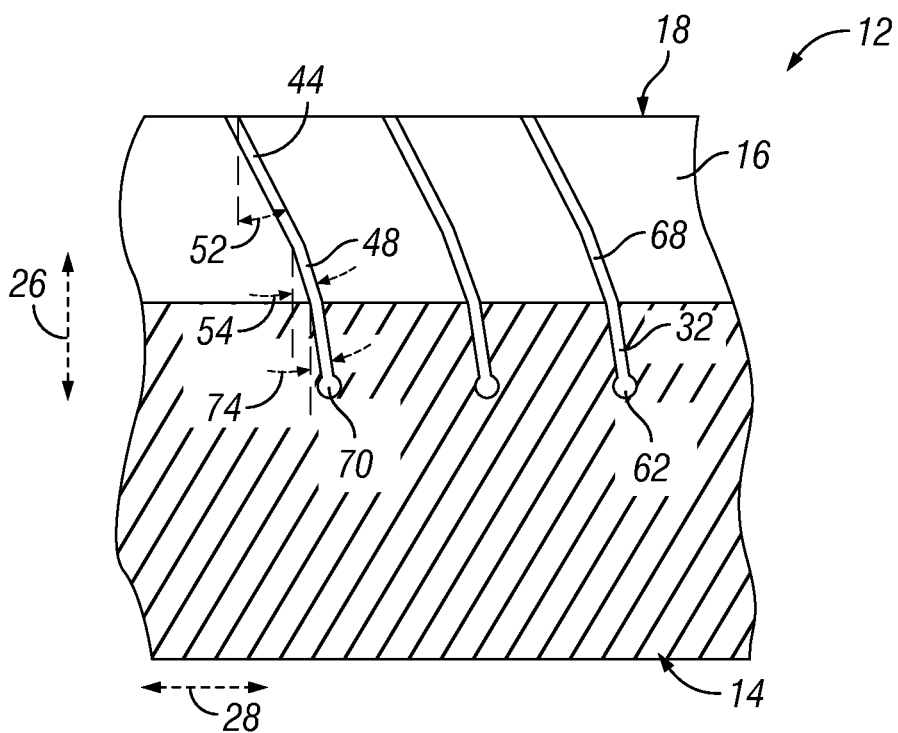
FIG. 19 is a cross-sectional view taken along line 19-19 of FIG. 15.

Aside from having different width angles 46, 50, 72, the various portions 44, 48, 70 also feature different thickness angles 52, 54, 74. FIG. 19 shows the extension of the decoupling void sipe 32 in the thickness direction 26. The first portion 44 is oriented at a first thickness angle 52, and the second portion 48 is oriented at a second thickness angle 54. The first thickness angle 52 has a magnitude greater than the magnitude of the second thickness angle 54. The third portion 70 is oriented at a third thickness angle 74 to the thickness direction 26 which has a magnitude less than the magnitudes of the first and second thickness angles 52, 54. In one embodiment, the first thickness angle 52 is 25 degrees, the second thickness angle 54 is 15 degrees, and the third thickness angle 74 is 5 degrees.

Figure 20:
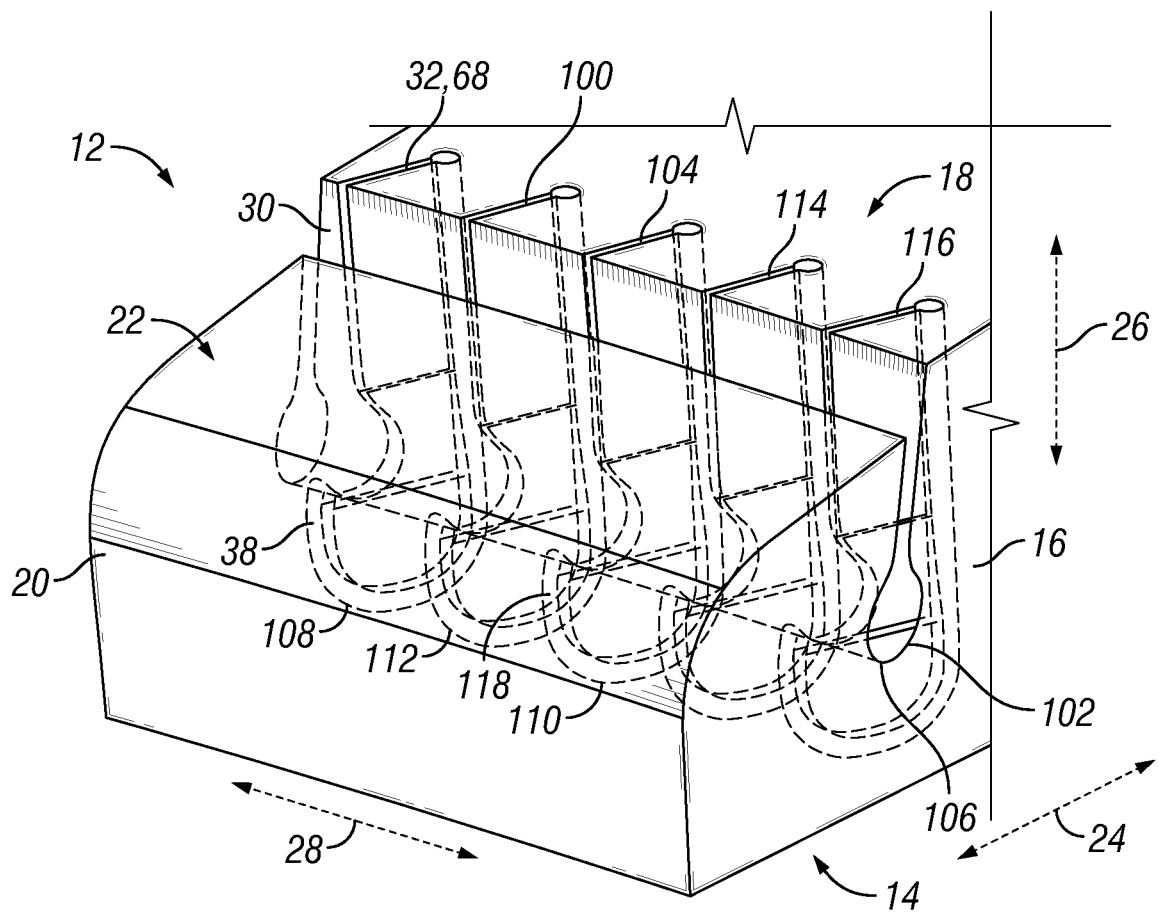
FIG. 20 is a perspective view of a tread section with five successive decoupling void sipes that all extend the same distance to the bottom surface.
Figure 21:
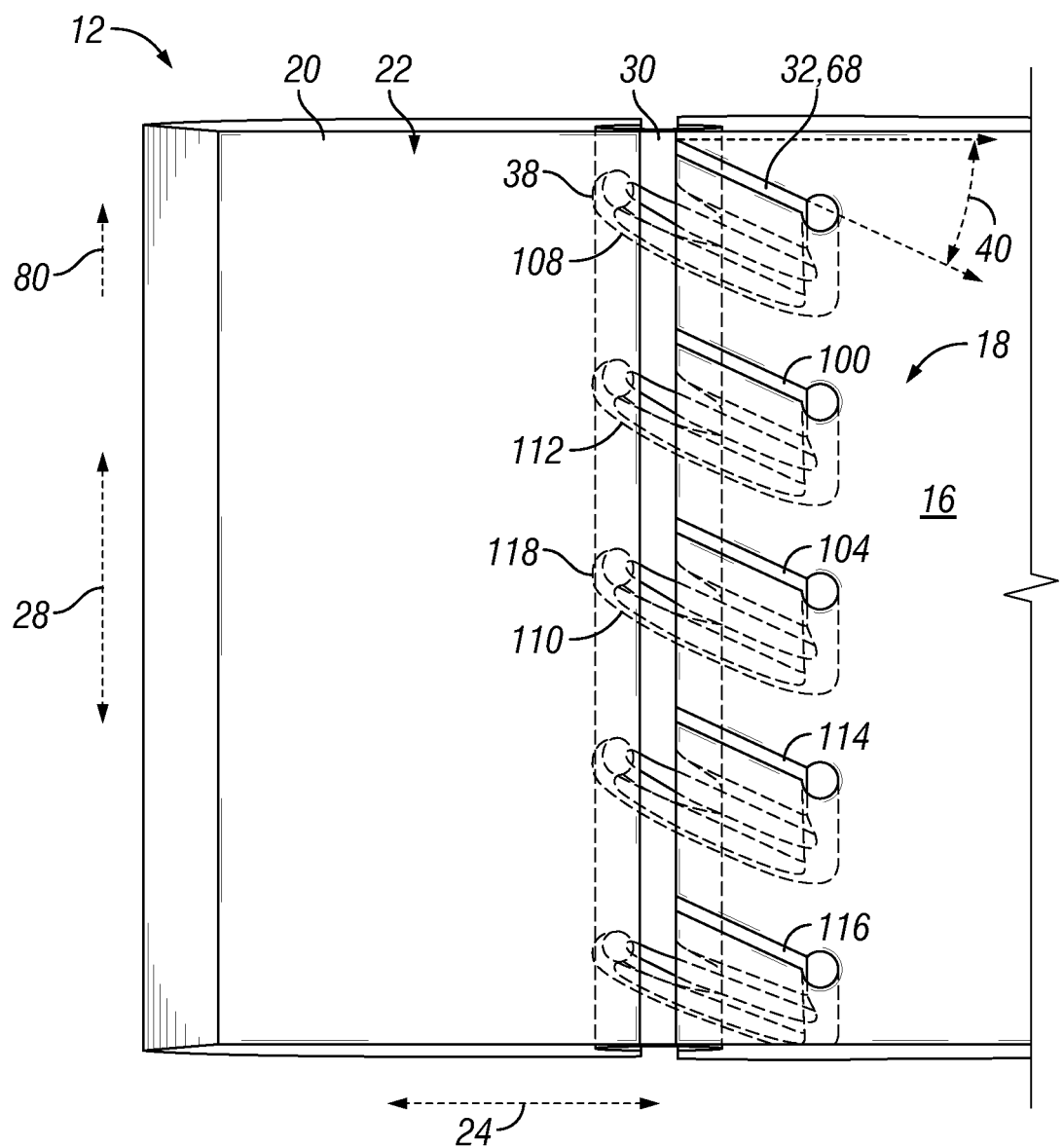
FIG. 21 is a top view of FIG. 20.
Figure 22:
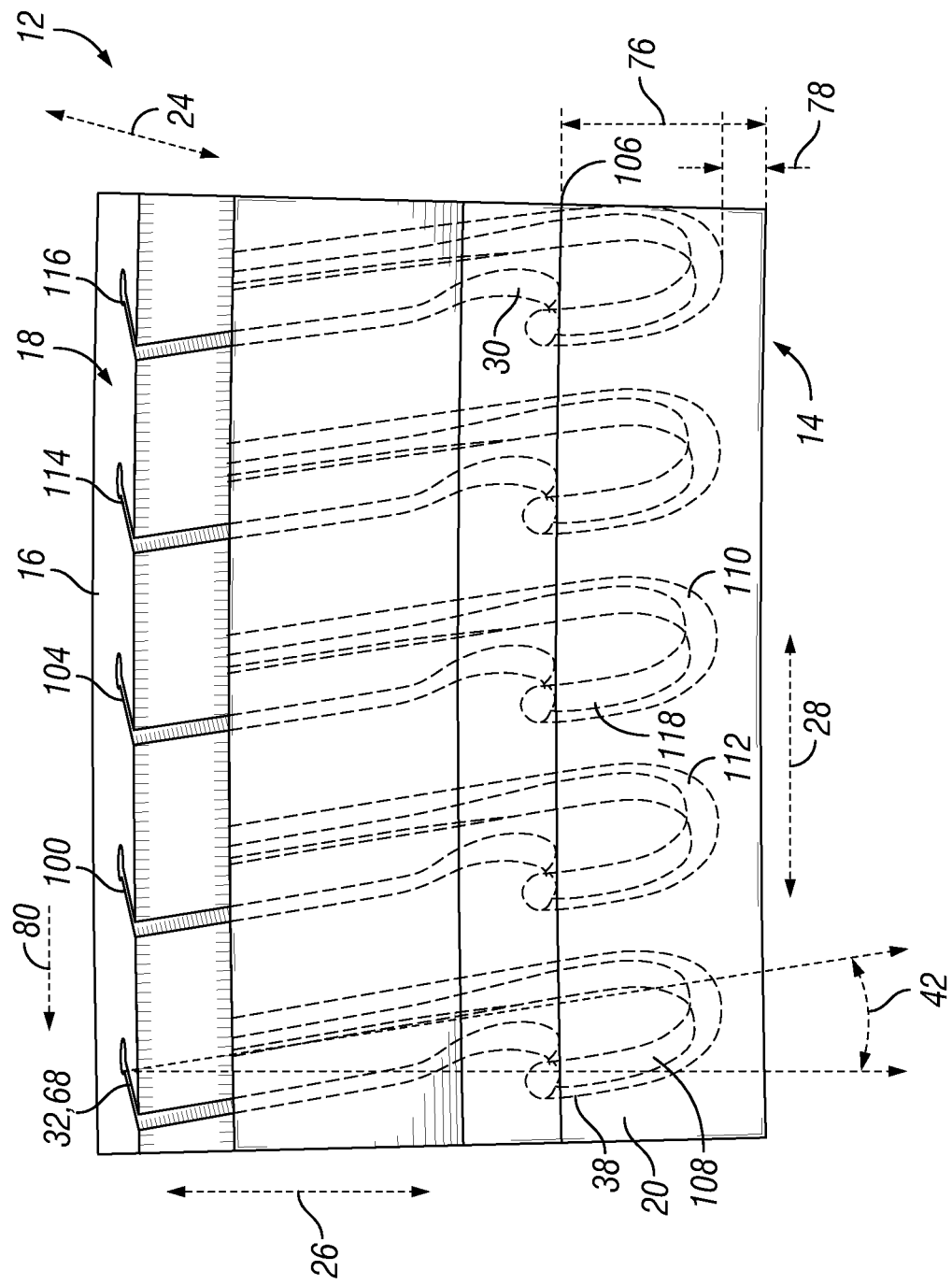
FIG. 22 is a perspective view, primarily a side view, of FIG. 20.
Figure 23:
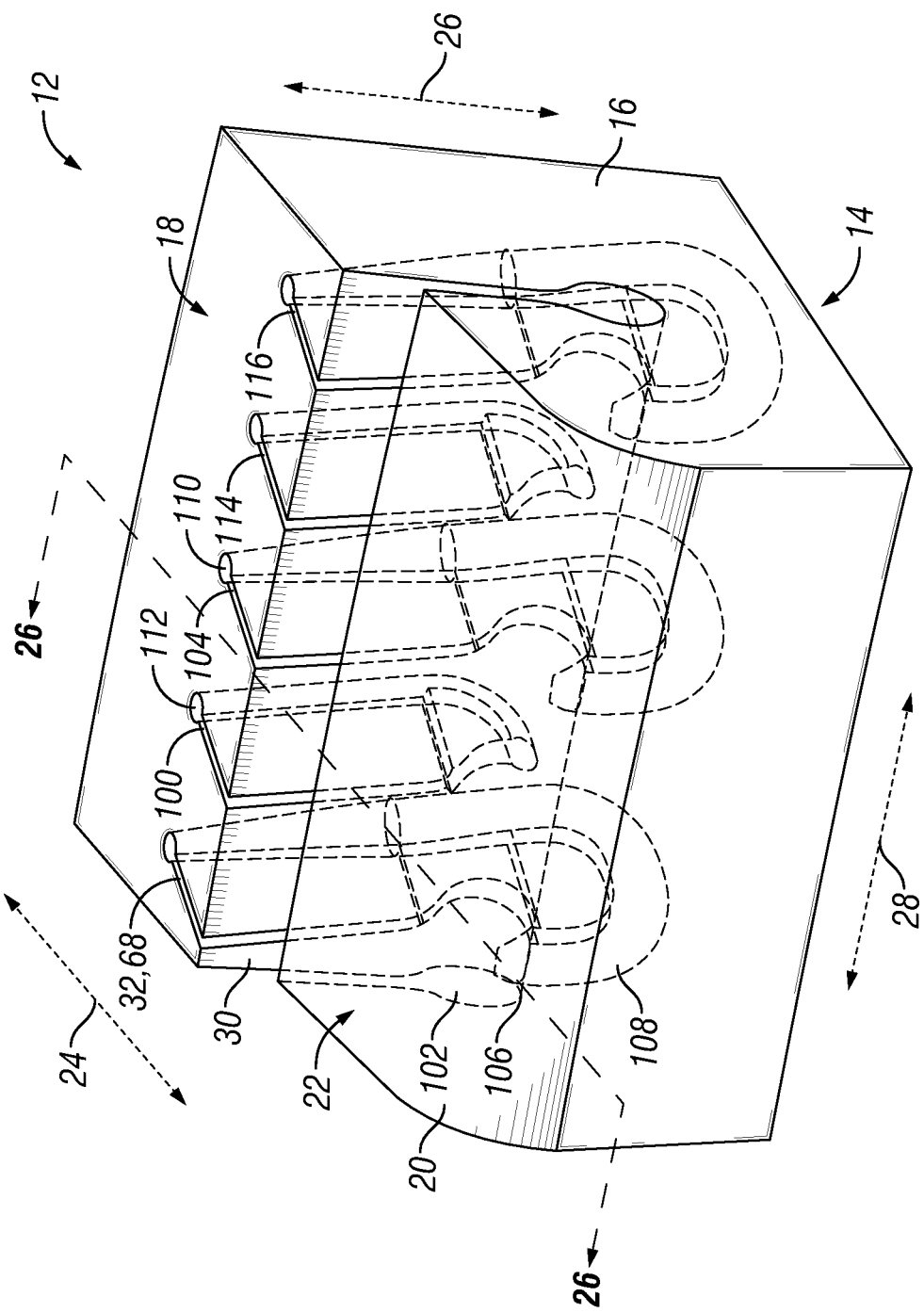
FIG. 23 is a perspective view of a tread section with five successive decoupling void sipes that alternate in that successive decoupling void sipes extend different distances to the bottom surface.
Figure 24:
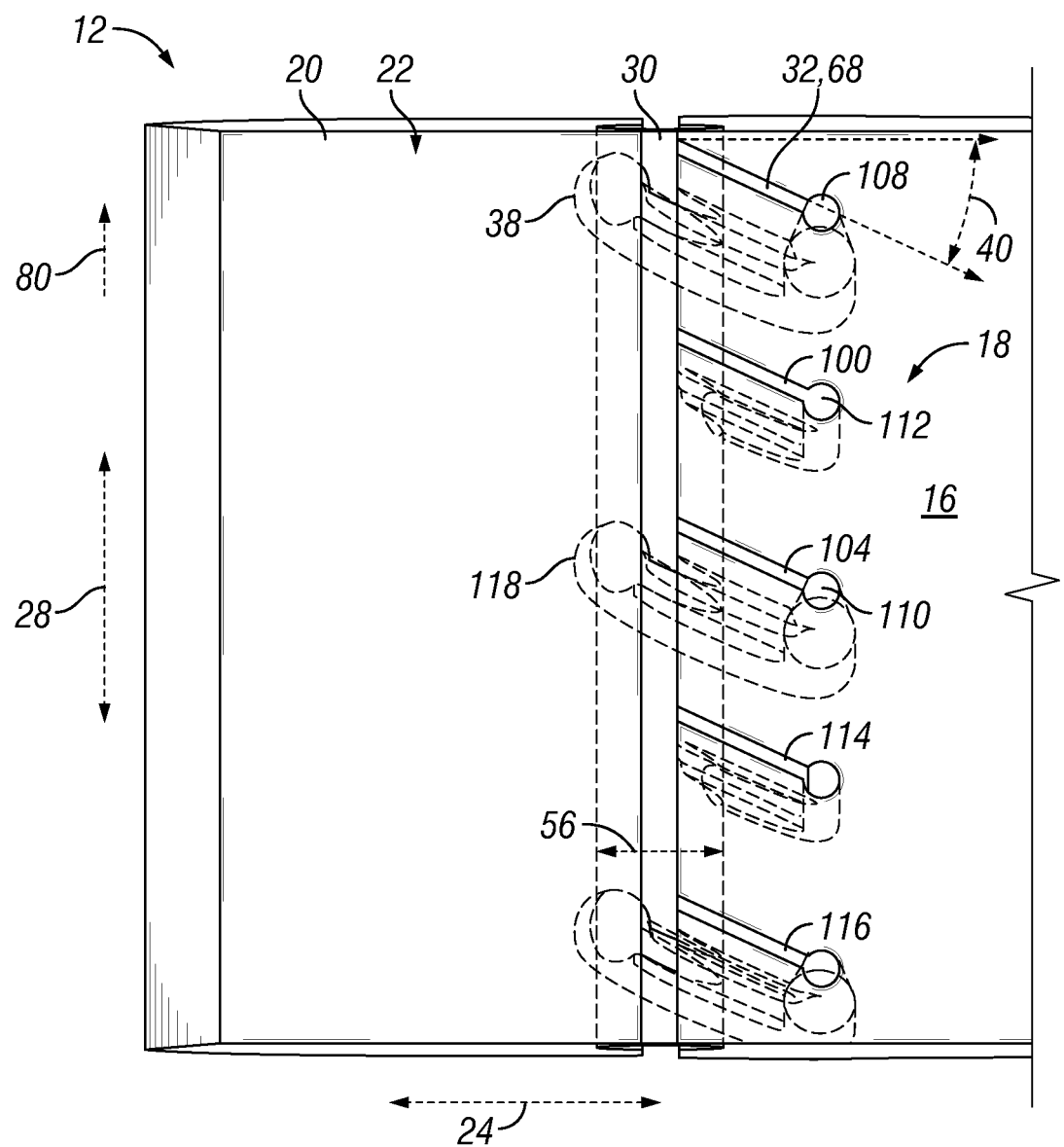
FIG. 24 is a top view of FIG. 23.
Figure 25:
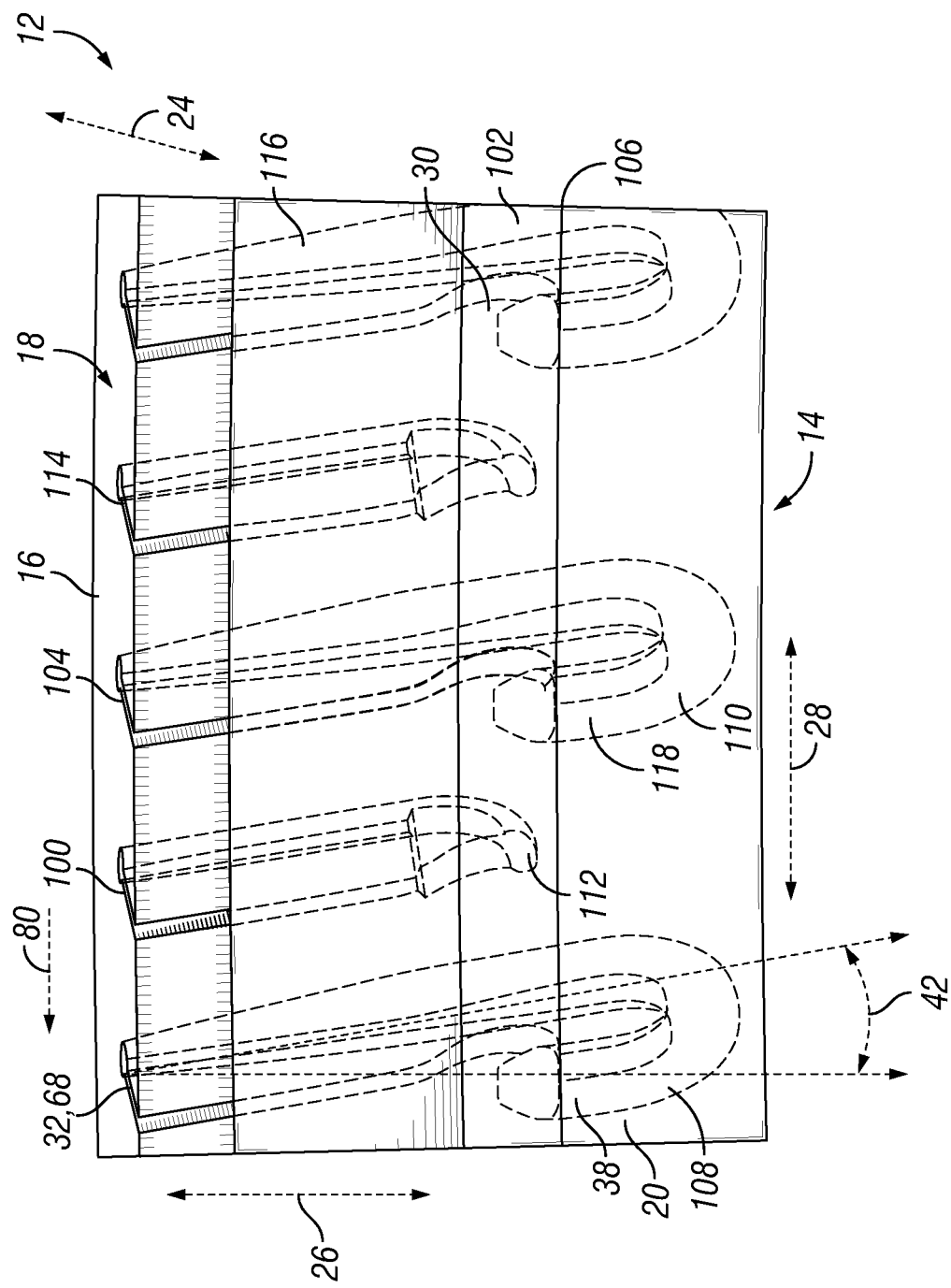
FIG. 25 is a perspective view, primarily a side view, of FIG. 23.
Figure 26:
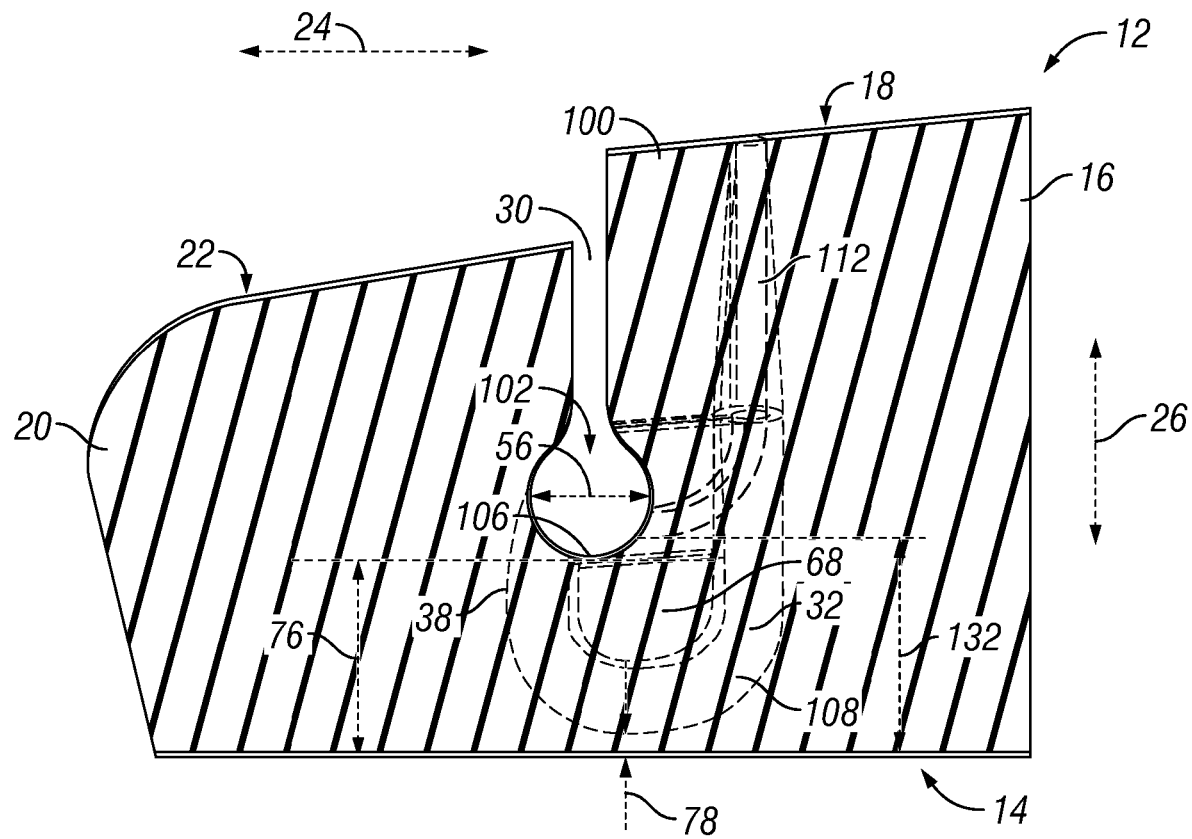
FIG. 26 is a cross-sectional view taken along line 26-26 of FIG. 23.
Figure 27:
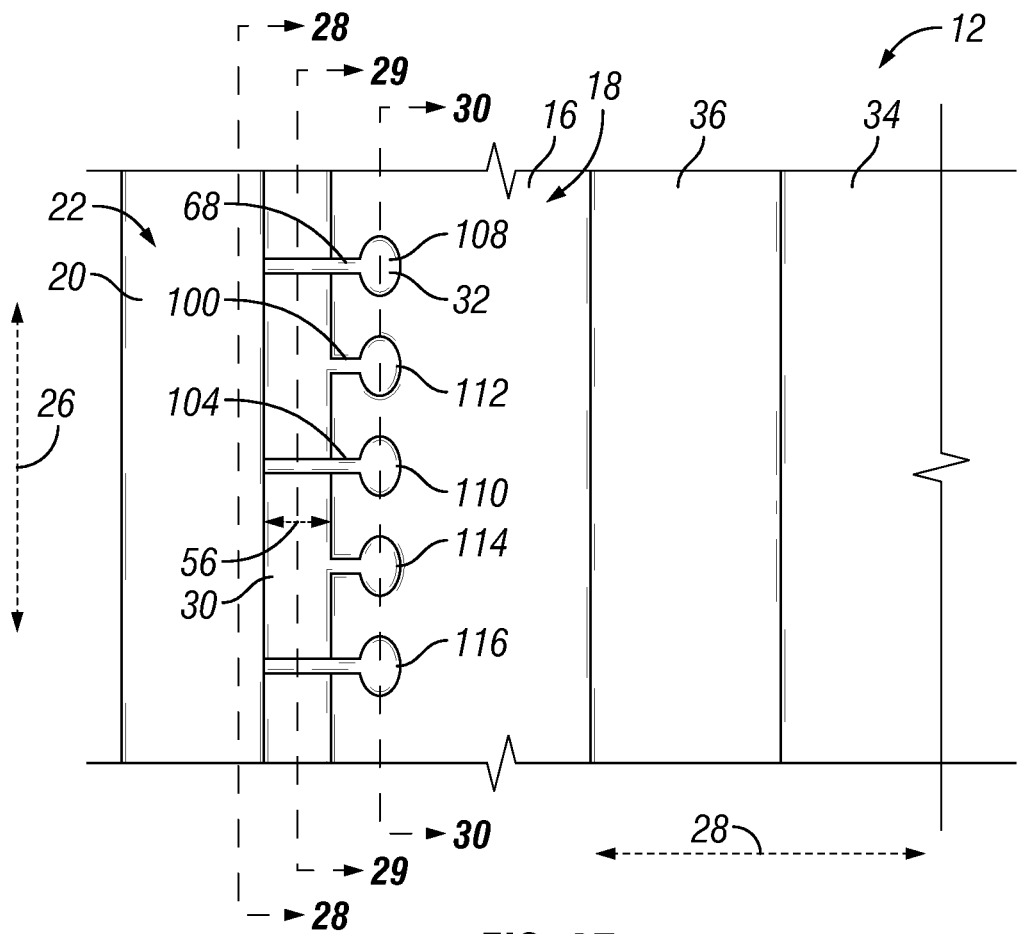
FIG. 27 is a top view of a tread section with five successive decoupling void sipes that alternate in extension distances to the bottom surface in accordance with another exemplary embodiment.
Figure 28:
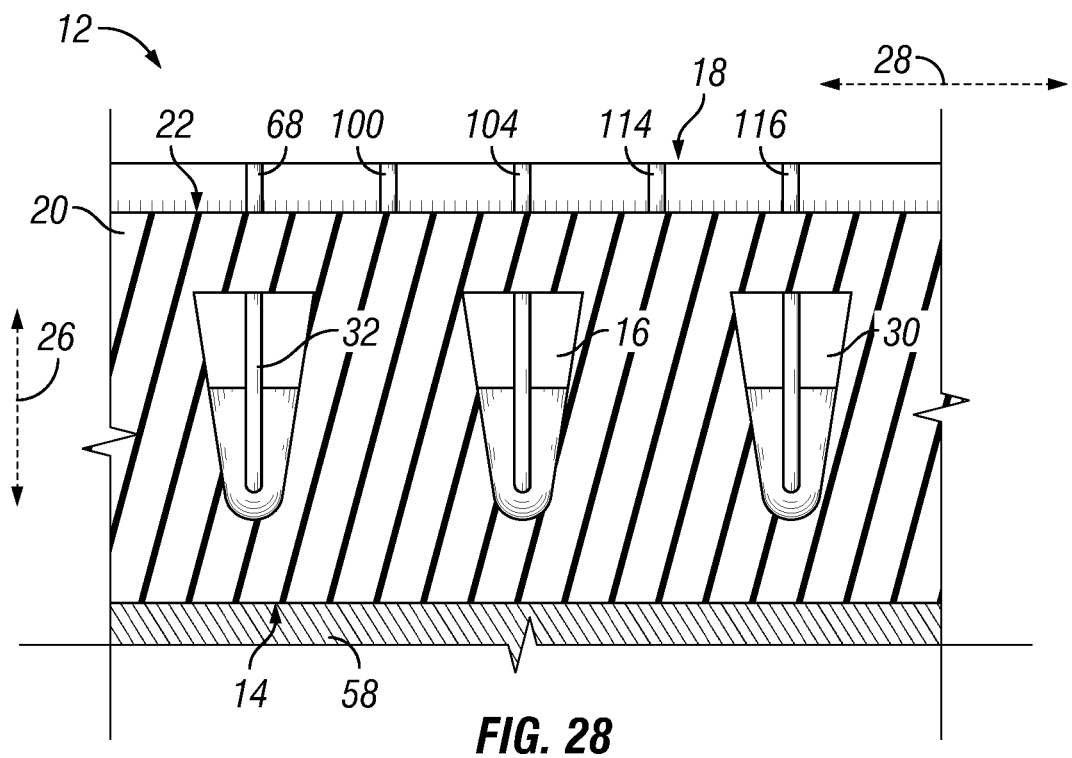
FIG. 28 is a cross-sectional view taken along line 28-28 of FIG. 27.
Figure 29:
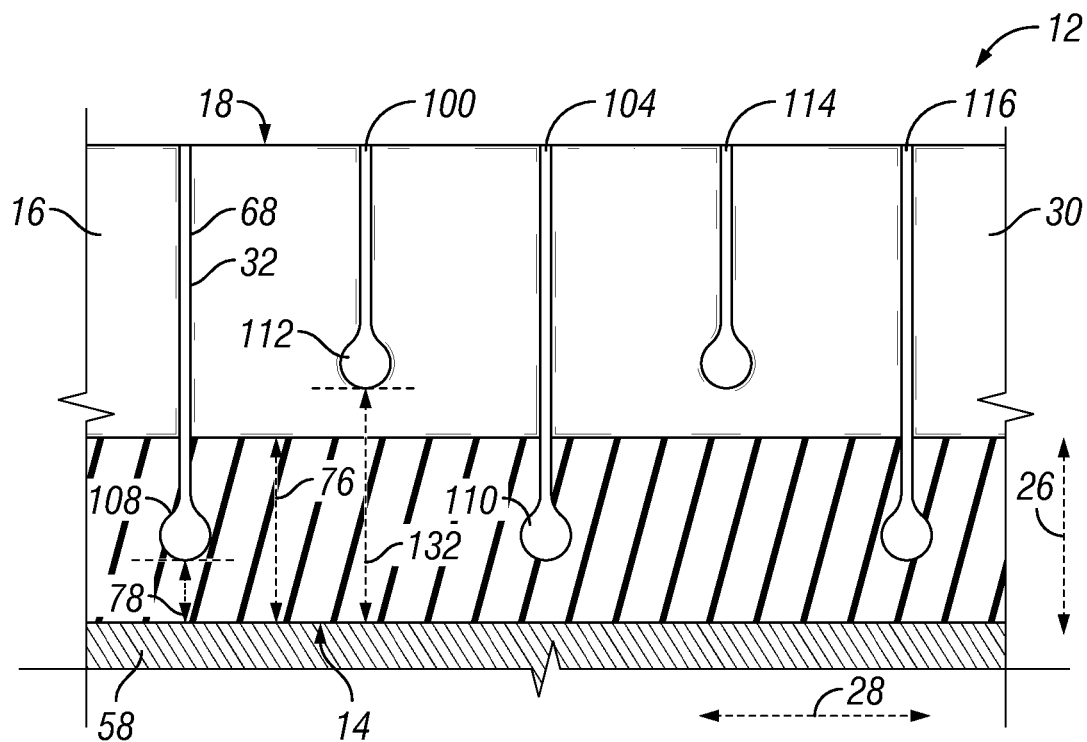
FIG. 29 is a cross-sectional view taken along line 29-29 of FIG. 27.
Figure 30:
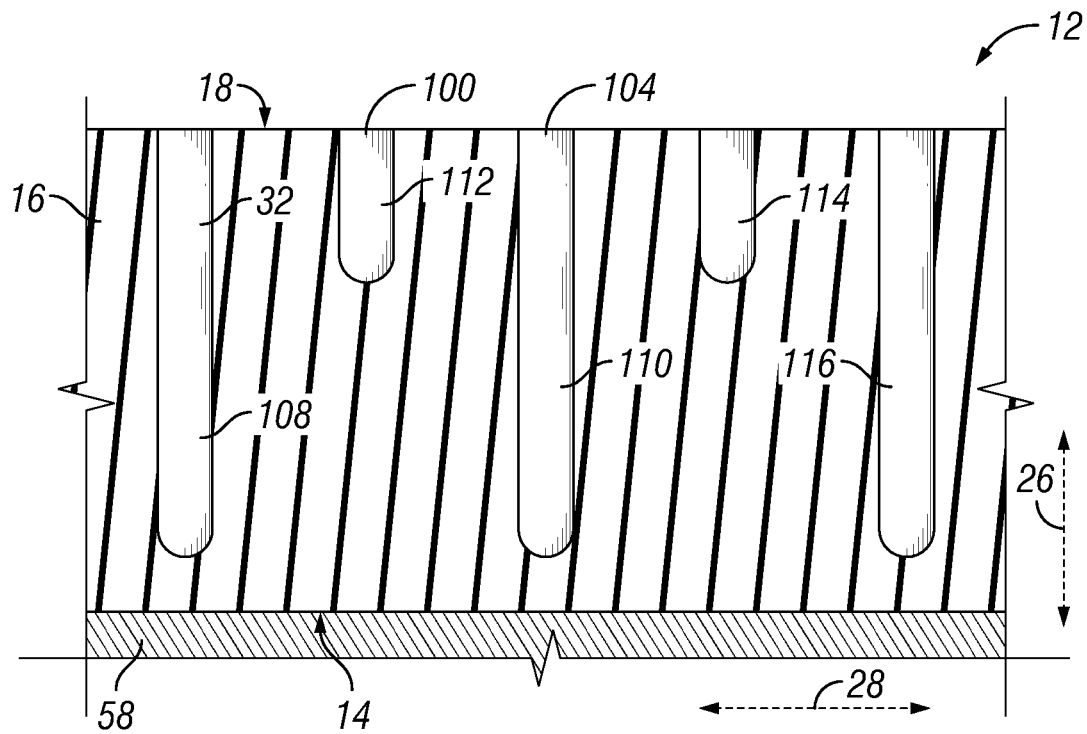
FIG. 30 is a cross-sectional view taken along line 30-30 of FIG. 27.
Figure 34:
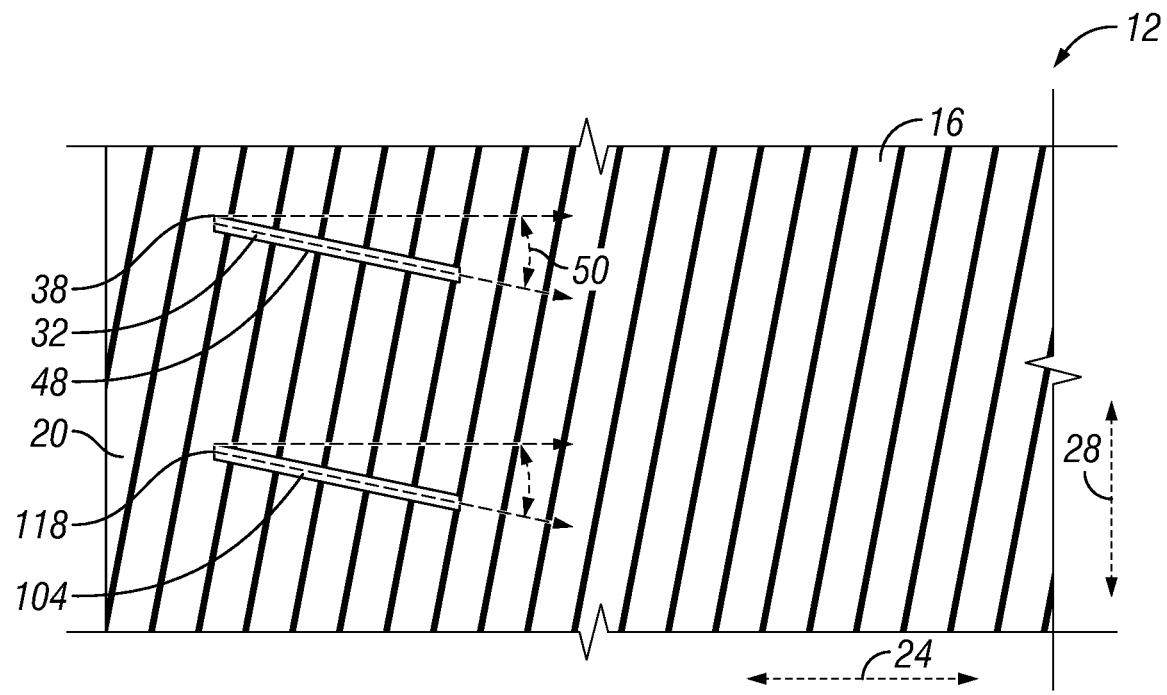
FIG. 34 is a cross-sectional view taken along line 34-34 of FIG. 31 that also includes elements forward of the cross-sectional cut of FIG. 31 such as the third decoupling void sipe.

FIGS. 20-22 show a section of the tread 12 in which five of the decoupling void sipes are shown spaced uniformly from one another and all bridging the decoupling void 30 so that they extend into the sacrificial rib 20 as in certain previously described embodiments. The decoupling void sipes are spaced so that successive decoupling void sipes are from 4-6 millimeters from one another in the circumferential direction 28. As such, the second decoupling void sipe 100 is from 4-6 millimeters from the first decoupling void sipe 32 in the circumferential direction 28, and the third decoupling void sipe 104 is from 4-6 millimeters from the second decoupling void sipe 100 in the circumferential direction 28. The successive decoupling sipes 114, 116 are likewise spaced from one another from 4-6 millimeters in the circumferential direction 28, and this sipe spacing is within this range around the entire tread 12 of the tire 10. This spacing of the decoupling void sipes 32, 100, 104, 114, 116 at the shoulder rib upper surface 18 is selected so that it is effective in countering the onset of irregular wear of the tread 12. However, if the decoupling void sipes 32, 100, 104, 114, 116 extend under the decoupling void 30 as disclosed the bottom of the decoupling void 30 will have the sipes 32, 100, 104, 114, 116 likewise spaced successively 4-6 millimeters from one another around the tread 12 thus creating a good deal of empty space at the bottom of the decoupling void 30. This large amount of opening at the bottom of the decoupling void 30 may reduce the robustness of the design and could lead to aggression damage at this portion of the tread 12. If cracking occurs at the bottom of the decoupling void 30 it may cause early removal of the tire 10 due to customer dissatisfaction.

In order to maintain the same 4-6 successive millimeter spacing at the shoulder rib upper surface 18 to protect against irregular wear, but at the same time increasing material at the bottom of the decoupling void 30 to reduce possible aggression damage, alternating decoupling void sipes 100, 114 are not at full depth. FIGS. 23-26 show another exemplary embodiment of the design in which the bridging below the decoupling void 30 is still present to achieve the benefits as previously discussed. However, this bridging is only present in every other sipe such as the odd numbered decoupling void sipes 32, 104, 116. The first decoupling void sipe 32 has a distance 78 smaller than the distance 76 from the bottom location 106 of the decoupling void 30 so that the first decoupling void sipe 32 is closer in the thickness direction 26 to the bottom surface 14 than the decoupling void 30 is to the bottom surface 14 in the thickness direction 26. However, the second decoupling void sipe 100 extends into the shoulder rib 16 in the thickness direction 26 to a location short of the bottom location 106. In this regard, the decoupling void 30 is closer to the bottom surface 14 in the thickness direction 26 than the second decoupling void sipe 100 is to the bottom surface 14 in the thickness direction 26. The bottom location 106, which is the lowest point of the decoupling void 30, is thus closer to the bottom surface 14 in the thickness direction 26 than is the second decoupling void sipe 100 to the bottom surface 14 in the thickness direction 26.

The second decoupling void sipe 100 extends into the shoulder rib 16 and terminates at the teardrop 102 of the decoupling void 30 in the thickness direction 26. The second decoupling void sipe 100 has the same shape as the first decoupling void sipe 32 but does not extend the same amount of the first decoupling void sipe 32 and does not bridge under the decoupling void 30 and extend into the sacrificial rib 20 as does the first decoupling void sipe 32. The next successive sipe in the circumferential direction 28 is the third decoupling void sipe 104, and the third decoupling void sipe 104 is arranged in the same manner as the first decoupling void sipe 32 in that it is closer to the bottom surface 14 than the decoupling void 30 and bridges the bottom of the decoupling void 30 so as to be located within the sacrificial rib 20. The distance between successive bridging of the decoupling void 30 is thus increased in the circumferential direction 28 and can be greater than 4-6 millimeters due to the second decoupling void sipe 100 between the first and third decoupling void sipes 32, 104 not bridging to the sacrificial rib 20. The spacing at the shoulder rib upper surface 18 is maintained so that the successive sipe spacing is smaller at the shoulder rib upper surface 18 than the successive sipe spacing at the bottom of or below the decoupling void 30.

The continuing decoupling void sipes are labeled as even numbered decoupling void sipes 114 and odd numbered decoupling void sipes 116 and they extend completely around the tread 12 in the circumferential direction 28. The even and odd numbered sipes 114, 116 establish a structure in which the even numbered sipes 114 terminate at or above the bottom location 106, while the odd numbered decoupling void sipes 116 terminate below the bottom location 106 so as to be located closer to the bottom surface 14 in the thickness direction 26. Although described as all of the sipes 32, 100, 104, 114, 116 alternating in sequence completely 360 degrees around the tread 12, it is to be understood that in other exemplary embodiments not all of the sipes 32, 100, 104, 114, 116 in the tread 12 alternate sequentially as described. In these instances, only three of the sipes 32, 100, 104 need alternate sequentially in that the second decoupling void sipe 100 terminates higher than the first and second decoupling void sipes 32, 104 in the thickness direction 26. The remaining sipes 114, 116 in the tread 12 may or may not alternate sequentially as discussed.

In the FIG. 23-26 embodiment, all of the decoupling void sipes 32, 100, 104, 114, 116 are angled relative to the width direction 24 so as to be at a non-zero angle relative to the width direction 24 and the entire sipes 32, 100, 104, 114, 116 are at this angle and do not vary at any location. All of the decoupling void sipes 32, 100, 104, 114, 116 are also angled relative to the thickness direction 26 the same amount which is of a non-zero magnitude, and all of the portions of the sipes 32, 100, 104, 114, 116 are at this non-zero angle. The second and even numbered decoupling void sipes 100, 114 all have a second teardrop portion 112 that is their inboard most extent in the width direction 24 and that extend to and terminate at the teardrop 102 of the decoupling void 30. The end of the second teardrop portions 112 open into the teardrop 102 and this opening is completely contained within the teardrop 102 and none of it is within the segment of the decoupling void 30 that is above its teardrop 102 in the thickness direction 26. The first decoupling void sipe 32 has a first teardrop portion 108, and the third decoupling void sipe 104 has a third teardrop portion 110. The odd numbered decoupling void sipes 116 have their own respective teardrop portions as well. These teardrop portions 108, 110 extend under the decoupling void 30 in the thickness direction 26 and terminate completely within the teardrop 102 by opening into the teardrop 102. No part of the teardrop portions 108, 110 open into the section of the decoupling void 30 that is above the teardrop 102. The first farthest outboard extent 38 of the first decoupling void sipe 32 is located outboard from the entire decoupling void 30 in the width direction 24. The third decoupling void sipe 104 extends to a third farthest outboard extent 118 in the width direction 24 that is the same extension in the width direction 24 as the first farthest outboard extent 38. The third farthest outboard extent 118 can be located in the sacrificial rib 20.

Another exemplary embodiment of the tread 12 is illustrated in FIGS. 27-30 in which the various decoupling void sipes 32, 100, 104, 114, 116 are all at zero degree angles with respect to both the width direction 24 and the thickness direction 26. The decoupling void 30 does not have a teardrop 102. The sipes 32, 104, 116 have teardrops 108, 110 that do not open into the decoupling void 30, but the main section of the sipes 32, 104, 116 above the teardrops 108, 110 do in fact open into the decoupling void 30. The sipes 32, 104, 116 including the teardrops 108, 110 extend into the sacrificial rib 20 but do not extend to or open into the upper surface 22. The cross-sectional shapes and sizes of the teardrops 108, 110 are not constant along their entire lengths but change so that they become larger as the teardrops 108, 110 move from the shoulder rib 16 under the decoupling void 30 and into the sacrificial rib 20 such that they are larges at their termination in the sacrificial rib 20 at the end of the sipes 32, 104, 116. The second and even numbered decoupling void sipes 100, 114 have teardrops 112 and again do not extend below the bottom location 106 in the thickness direction 26. It is to be understood that the sipes 100, 114 may extend to the bottom location 106 but not below the bottom location 106 in the thickness direction 26 in accordance with other exemplary embodiments. The distance 132 of the second decoupling void sipe 100 to the bottom surface 14 is greater than the distance 78 and is greater than the distance 76. The entire teardrops 112 of the sipes 100, 114 open into the decoupling void 30. The disclosed arrangement provides increased spacing between sipes at the bottom of the decoupling void 30 in the circumferential direction 28 but includes closer sipe spacing at the upper surface 18 in the circumferential direction 28. All of the teardrops 108, 112, 110 of all of the decoupling groove sipes 32, 100, 104, 114, 116 are the same size and shape at the upper surface 18 and do not increase in size upon their extension from the upper surface 18.

Figure 31:
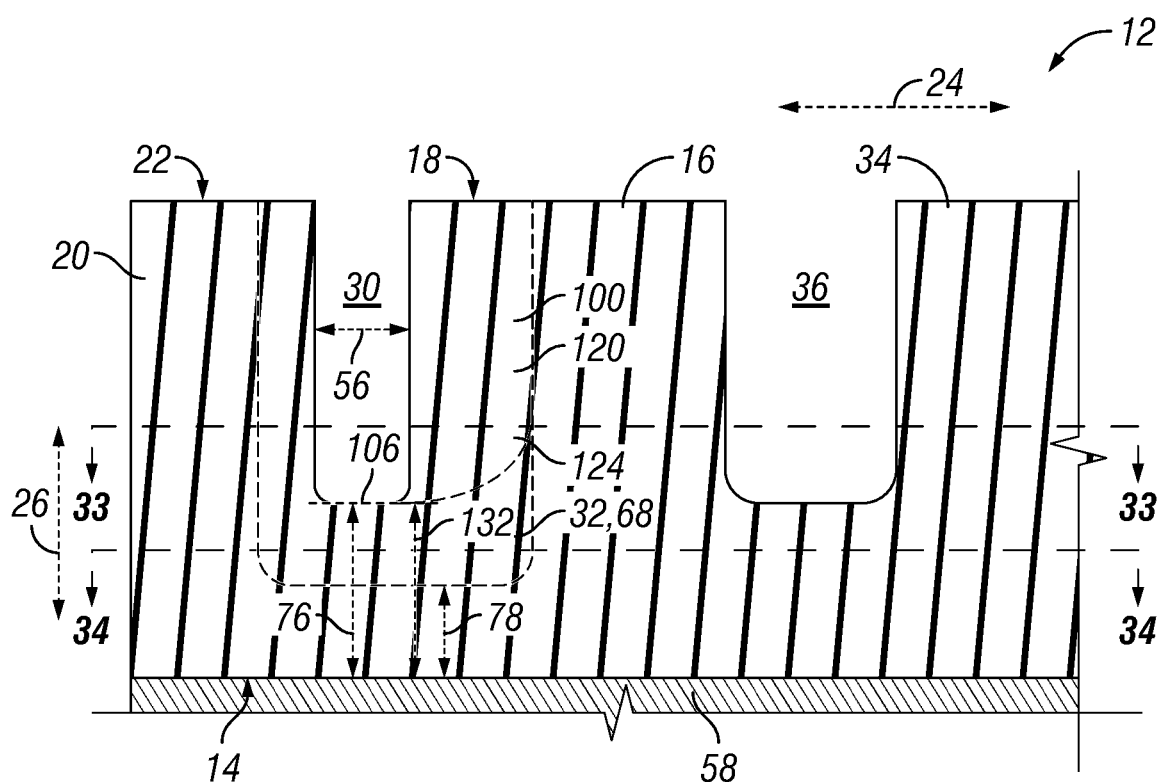
FIG. 31 is a cross-sectional view along line 31-31 of FIG. 32 of a tread in accordance with another exemplary embodiment.
Figure 32:
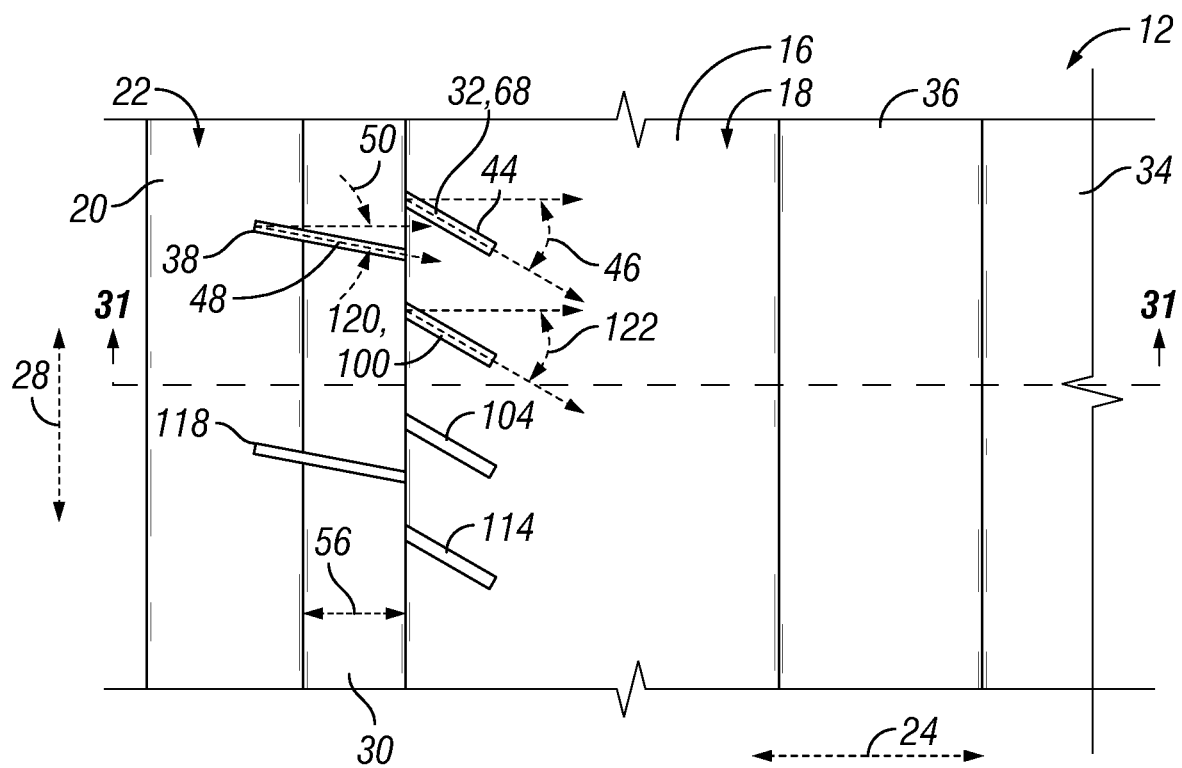
FIG. 32 is a top view of the tread of the tread in accordance with another exemplary embodiment.
Figure 33:
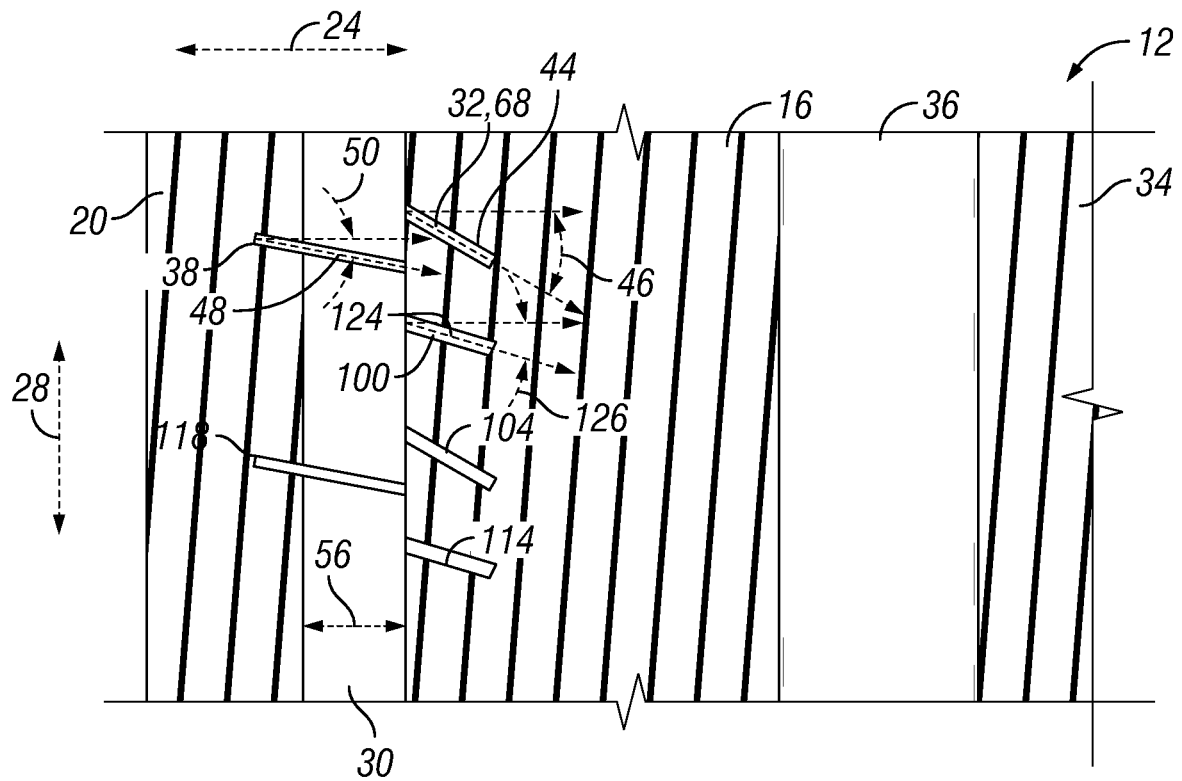
FIG. 33 is a cross-sectional view taken along line 33-33 of FIG. 31 that also includes elements forward of the cross-sectional cut of FIG. 31 such as the decoupling void sipes shown in FIG. 32.

FIGS. 31-34 show another exemplary embodiment of the tread 12 in which the various decoupling void sipes again have an alternating sequence in which sipes that extend closer to the bottom surface 14 and below the decoupling void 30 are located between sipes that do not extend below the bottom of the decoupling void 30 so that the decoupling void is the same or greater distance in the thickness direction 26 to the bottom surface 14. None of the decoupling void sipes have teardrops, and the decoupling void 30 likewise does not have a teardrop 102 at its bottom. As shown in FIG. 31, the second decoupling void sipe 100 extends to the bottom location 106 in the thickness direction 26 so that the distances 76, 132 are identical. The distance 78 is less than both of the distances 76, 132. The first and third decoupling void sipes 32, 104 extend into the sacrificial rib 20 and are open at the upper surface 22.

The first decoupling void sipe 32 has a first portion 44 at the upper surface 18 that is oriented at first width angle 46 to the width direction 24 that is not zero degrees. The first portion 44 extends in the thickness direction 26 to the bottom location 106, and thus along the entire decoupling void 30, at which point the first portion 44 transitions to a second portion 48. The second portion 48 of the first decoupling void sipe 32 is located under the decoupling void 30 and is in the sacrificial rib 20 and is oriented at a second width angle 50 to the width direction 24. The second width angle 50 is less than the first width angle 46 and thus has a different magnitude thereto and is at a magnitude that is not zero. Although two portions 44, 48 with two distinct width angles 46, 50 are shown, the first decoupling void sipe 32 may have any number of portions and width angles in other embodiments. The successive second decoupling void sipe 100 has a first section 120 that is at the upper surface 18 and that is oriented relative to the width direction 24 at a first section width angle 122 that is not zero degrees. The angles 122 and 46 may be the same in some embodiments. At some point in the extension of the second decoupling void sipe 100 in the thickness direction 28 before reaching the bottom location 106, the first section 120 transitions into a second section 124 that itself extends to the bottom location 106. The second section 124 has a second section width angle 126 relative to the width direction 24 that is not zero degrees. The second section width angle 126 may have the same magnitude as the second width angle 50 or may be of a different magnitude thereto. Again, although two sections 120, 124 with two width angles 122, 126 are shown any number can be present in other embodiments. The third decoupling void sipe 104 can be configured in the same manner as the first decoupling void sipe 32 as previously discussed with respect to the two or more portions 44, 48 and their width angles 46, 50. The additional decoupling void sipes 114, 116 can likewise be arranged in a similar manner to their counterpart first and third sipes 32, 104 or their counterpart second decoupling void sipe 100 so that they have varying width angles.

Figure 35:
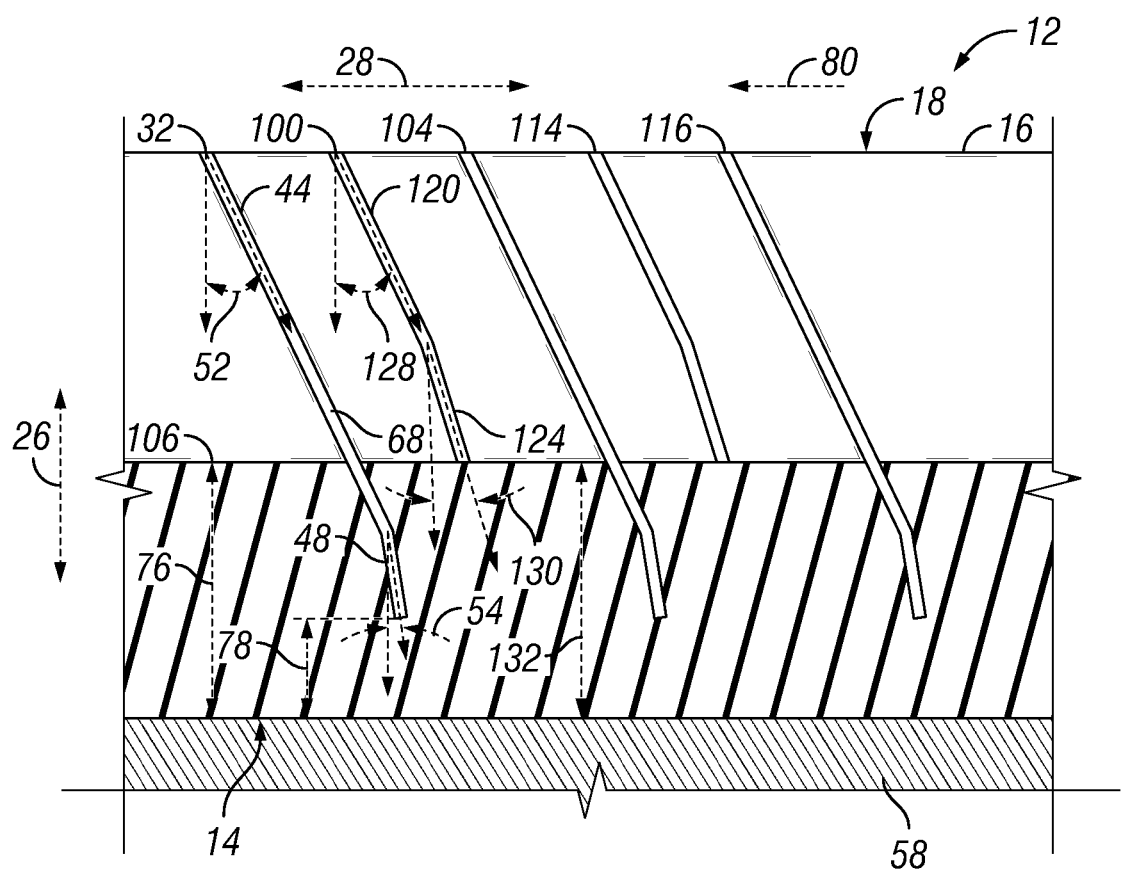
FIG. 35 is a cross-sectional view of tread in accordance with another exemplary embodiment in which the decoupling void sipes are angled multiple times relative to the thickness direction.

FIG. 35 is a cross-sectional view of another exemplary embodiment of the tread 12 in which successive decoupling void sipes alternate in their extension towards the bottom surface 14 so that greater spacing between the sipes is provided at the bottom of the decoupling void 30. The FIG. 35 embodiment illustrates how the various sipes can be configured as angled to the thickness direction 26 so that they extend from the upper surface 18 into the thickness direction 26 in a direction against the rolling direction 80. The first decoupling void sipe 32 has a first portion 44 that extends from the upper surface 18 and is oriented at a first thickness angle 52 to the thickness direction 26 that is not zero degrees. The first portion 44 extends in an angled direction opposite to the rolling direction 80. The first portion 44 extends below the bottom location 106 in the thickness direction 26 and then transitions into a section portion 48 that has a second thickness angle 54 with a magnitude different than the first thickness angle 52. The first portion 44 may extend a greater distance in the thickness direction 26 than the amount of extension of the second portion 48 into the thickness direction 26. The third decoupling void sipe 104 can be arranged in a similar manner as the first decoupling void sipe 32 with respect to the angled portions 44, 48. Further, the remaining odd numbered decoupling void sipes 116 can be configured in the same manner as the first and third decoupling void sipes 32, 104.

The second decoupling void sipe 100 has a first section 120 that extends from the upper surface 18 and is oriented at a first section thickness angle 128 to the thickness direction 26 that is not zero degrees. The first section 120 transitions to a second section 124 that extends to the bottom location 106 so as to terminate having the same distance 132 to the bottom surface 14 as the distance 76 and does not extend lower than the bottom location 106 with respect to the thickness direction 26. The second section 124 is oriented at a second section thickness angle 130 to the thickness direction 26 that is not zero degrees. The angles 128 and 130 can be different from one another and are not of the same magnitude. The first section thickness angle 128 may have the same magnitude as the first thickness angle 52 so that the first portion 44 and the first section 120 are oriented the same as one another with respect to the thickness direction 26. However, the angles 52 and 128 may be different in magnitude from one another in other embodiments. The second section thickness angle 130 may be of the same magnitude as the second thickness angle 54 or they can be of different magnitudes in other embodiments. The first section 120 may extend for a greater distance into the thickness direction 26 than does the second section 124. The remaining even numbered decoupling void sipes 114 can be arranged in the same manner as the second decoupling void sipe 100.

Figure 36:
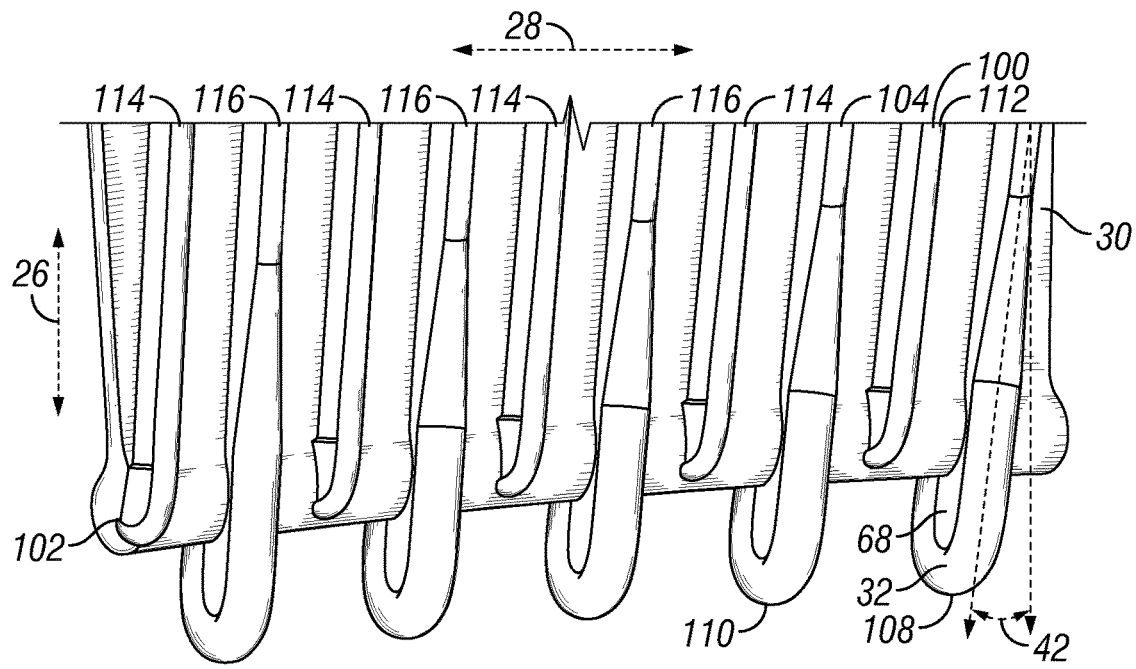
FIG. 36 is a side perspective view of the decoupling void and successive decoupling void sipes in one exemplary embodiment.
Figure 37:
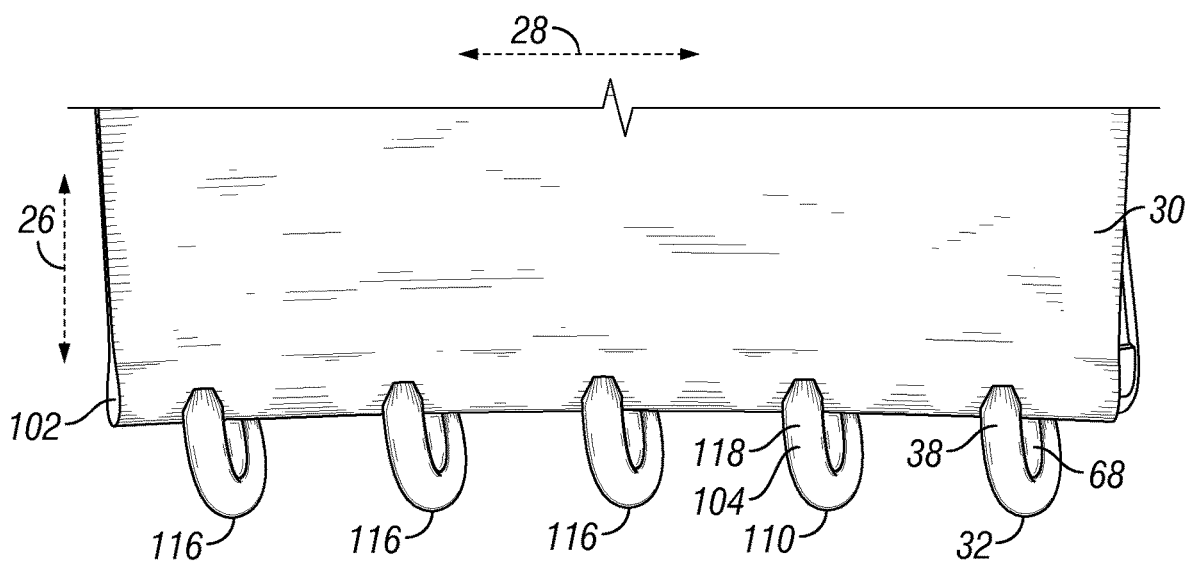
FIG. 37 is a side perspective view taken from the opposite side that FIG. 36 shows.

FIGS. 36 and 37 show a three dimensional view of the decoupling void 30, the first decoupling void sipe 32, the second decoupling void sipe 100, the third decoupling void sipe 104, and a plurality of the successive even and odd numbered decoupling void sipes 114, 116. All of the sipes are angled with respect to the thickness direction 26 and are evenly spaced from one another successively in the circumferential direction 28. The sipes 32, 104, 116 wrap around the decoupling void 30 and terminate at the teardrop 102 on an opposite side of the decoupling void 30 so that the sipes 32, 104, 116 form bridging under the decoupling void 30. The second and even numbered decoupling void sipes 100, 114 do not bridge under the decoupling void 30 but instead terminate at the teardrop 102 without extending to the bottom location 106 of the teardrop 102. The size of the teardrops of the sipes 32, 104, 116 increases upon their extension from the upper surface 118 to their termination in the sacrificial rib 20 as shown. In this embodiment the increase is in the shoulder rib 16 to their maximum size at which time the maximum size remains along most of the teardrop 102, under the teardrop 102 and into the sacrificial rib 20 without further increase. The size of the teardrops of the sipes 100, 114 is consistent along their entire lengths and they do not change in size.

The arrangement thus provides for successive sipe spacing at the upper surface 18 that is half that of the sipe bridging underneath the decoupling void 30. Doubling the spacing between successive sipes at the bottom of the decoupling void 30 adds rubber/material to the bottom of the decoupling void 30 which improves aggression performance of the tire 10 at this location at the bottom of the decoupling void 30. The smaller spacing of the sipes at the upper surface 18 and into the tread 12 from the upper surface 18 the amounts indicated improve irregular wear. The decoupling void sipes 32, 100, 104, 114, 116 that are configured so that successive sipes 32, 100, 104, 114, 116 are not identical to one another but instead are different from one another so that their amount of extension into the thickness direction 26 varies from one successive sipe to the other can be constructed in a variety of manners. For example, they can be made in any of the same ways previously discussed in this application regarding sipe construction for sipes that are all identical, that is successive sipes that are identical to one another. As such, it is to be understood that the successive alternating depth sipes to extend bridging spacing at the bottom of the decoupling void 30 as disclosed are only exemplary in shape and size, and that other shapes, sizes and configurations are possible in accordance with other exemplary embodiments of the tread 12 and tire 10.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A tread for a heavy truck tire that has a width direction, a thickness direction, and a circumferential direction, comprising:
    a bottom surface;
    a shoulder rib having a shoulder rib upper surface;
    a sacrificial rib having a sacrificial rib upper surface, wherein the sacrificial rib is located outboard from the shoulder rib in the width direction;
    a decoupling void that is located between the shoulder rib and the sacrificial rib in the width direction, wherein the decoupling void extends in the thickness direction; and
    a first decoupling void sipe that is in the shoulder rib and that opens at the shoulder rib upper surface and that opens at the decoupling void, wherein the first decoupling void sipe extends in the thickness direction, wherein the first decoupling void sipe is closer to the bottom surface than the decoupling void is to the bottom surface in the thickness direction;
    a second decoupling void sipe that is in the shoulder rib adjacent to the first decoupling void sipe in the circumferential direction, wherein the second decoupling void sipe opens at the shoulder rib upper surface and opens at the decoupling void, wherein the second decoupling void sipe extends in the thickness direction and is not closer to the bottom surface than the decoupling void is to the bottom surface in the thickness direction; and
    a third decoupling void sipe that is in the shoulder rib adjacent to the second decoupling void sipe in the circumferential direction such that the second decoupling void sipe is between the first and third decoupling void sipes in the circumferential direction, wherein the third decoupling void sipe opens at the shoulder rib upper surface and opens at the decoupling void, wherein the third decoupling void sipe extends in the thickness direction, wherein the third decoupling void sipe is closer to the bottom surface than the decoupling void is to the bottom surface in the thickness direction.

2. The tread as set forth in claim 1, wherein the decoupling void has a decoupling void teardrop, wherein the second decoupling void sipe extends to the decoupling void teardrop in the thickness direction but does not extend to a bottom location of the decoupling void that is at the decoupling void teardrop such that the decoupling void is closer to the bottom surface than the second decoupling void sipe in the thickness direction.

3. The tread as set forth in claim 2, wherein the first decoupling void sipe is located in the sacrificial rib, wherein the second decoupling void sipe is not located in the sacrificial rib, and wherein the third decoupling void sipe is located in the sacrificial rib.

4. The tread as set forth in claim 3, wherein the first decoupling void sipe has a first teardrop portion that extends from the shoulder rib to the sacrificial rib and is larger in size in the sacrificial rib than in the shoulder rib, and wherein the third decoupling void sipe has a third teardrop portion that extends from the shoulder rib to the sacrificial rib and is larger in size in the sacrificial rib than in the shoulder rib.

5. The tread as set forth in claim 1, further comprising even and odd numbered decoupling void sipes that with the first, second and third decoupling void sipes extend completely around the shoulder rib in the circumferential direction, wherein all of the even and odd numbered decoupling void sipes are spaced from one another in the circumferential direction;
    wherein all of the odd numbered decoupling void sipes are open at the shoulder rib upper surface and are open at the decoupling void, wherein all of the odd numbered decoupling void sipes are closer to the bottom surface than the decoupling void is to the bottom surface in the thickness direction;
    wherein all of the even numbered decoupling void sipes are open at the shoulder rib upper surface and are open at the decoupling void, wherein the even numbered decoupling void sipes are not closer to the bottom surface than the decoupling void is to the bottom surface in the thickness direction.

6. The tread as set forth in claim 1, further comprising:
    an intermediate rib, wherein the shoulder rib is located outboard from the intermediate rib in the width direction; and
    a shoulder tread groove that is located between the intermediate rib and the shoulder rib in the width direction, wherein the shoulder tread groove extends in the thickness direction, wherein the shoulder tread groove and the first and third decoupling void sipes are located the same distance from the bottom surface in the thickness direction.

7. The tread as set forth in claim 1, wherein the first decoupling void sipe extends in the width direction to a first farthest outboard extent of the first decoupling void sipe, wherein no portion of the decoupling void is farther outboard in the width direction than the first farthest outboard extent of the first decoupling void sipe;
    wherein the third decoupling void sipe extends in the width direction to a third farthest outboard extent of the third decoupling void sipe, wherein no portion of the decoupling void is farther outboard in the width direction than the third farthest outboard extent of the third decoupling void sipe.

8. The tread as set forth in claim 1, wherein the first decoupling void sipe is located in the sacrificial rib and extends in the width direction so as to have a first farthest outboard extent that is outboard from the decoupling void in the width direction;

wherein the third decoupling void sipe is located in the sacrificial rib and extends in the width direction so as to have a third farthest outboard extent that is outboard from the decoupling void in the width direction; and wherein the second decoupling void sipe is not located in the sacrificial rib.

9. The tread as set forth in claim 8, wherein the first decoupling void sipe is open at the sacrificial rib upper surface, and wherein the third decoupling void sipe is open at the sacrificial rib upper surface, wherein the second decoupling void sipe is not open at the sacrificial rib upper surface.

10. The tread as set forth in claim 1, wherein the first decoupling void sipe extends in the width direction such that a first portion of the first decoupling void sipe is located in the shoulder rib and is oriented at a first width angle that is not zero degrees with respect to the width direction, and wherein a second portion of the first decoupling void sipe is oriented at a second width angle that is not zero degrees with respect to the width direction, wherein the first width angle is different than the second width angle, and wherein the second portion extends closer to the bottom surface in the thickness direction than does the decoupling void.

11. The tread as set forth in claim 10, wherein the second decoupling void sipe extends in the width direction such that a first section of the second decoupling void sipe is located in the shoulder rib and is oriented at a first section width angle that is the same as the first width angle, and wherein a second section of the second decoupling void sipe is oriented at a second section width angle that is not zero degrees with respect to the width direction, wherein the first section width angle is different than the second section width angle, and wherein the second section is closer to the bottom surface than the first section is to the bottom surface in the thickness direction.

12. The tread as set forth in claim 1, wherein the first decoupling void sipe extends in the thickness direction such that a first portion of the first decoupling void sipe is oriented at a first thickness angle that is not zero degrees with respect to the thickness direction, and wherein a second portion of the first decoupling void sipe is oriented at a second thickness angle that is not zero degrees with respect to the thickness direction, wherein the first thickness angle is different than the second thickness angle.

13. The tread as set forth in claim 12, wherein the second decoupling void sipe extends in the thickness direction such that a first section of the second decoupling void sipe is oriented at a first section thickness angle that is the same as the first thickness angle of the first portion of the first decoupling void sipe, and wherein a second section of the second decoupling void sipe is oriented at a second section thickness angle that is not zero degrees with respect to the thickness direction, wherein the first section thickness angle is different than the second section thickness angle.

\* \* \* \* \*